(12) United States Patent
Hu

(10) Patent No.: US 7,007,501 B2
(45) Date of Patent: Mar. 7, 2006

(54) SYSTEM, APPARATUS, AND METHOD FOR PASSIVE AND ACTIVE REFRIGERATION OF AT LEAST ONE ENCLOSURE

(75) Inventor: Ben P. Hu, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 266 days.

(21) Appl. No.: 10/641,415

(22) Filed: Aug. 15, 2003

(65) Prior Publication Data

US 2005/0034477 A1 Feb. 17, 2005

(51) Int. Cl.
*F25B 21/02* (2006.01)
*F25D 17/02* (2006.01)

(52) U.S. Cl. .............................. 62/435; 62/3.7; 62/3.3; 62/239

(58) Field of Classification Search .................. 62/435, 62/3.7, 3.3, 430, 438, 239, 99, 238.6, 244; 165/41, 104.34
See application file for complete search history.

(56) References Cited

U.S. PATENT DOCUMENTS

| | | | |
|---|---|---|---|
| 4,969,509 A | 11/1990 | Merensky | |
| 5,307,642 A | 5/1994 | Dean | |
| 5,369,960 A | 12/1994 | Mueller et al. | |
| 5,423,498 A | 6/1995 | Fluegel | |
| 5,513,500 A | 5/1996 | Fischer et al. | |
| 5,667,168 A | 9/1997 | Fluegel | |
| 5,702,073 A | 12/1997 | Fluegel | |
| 5,711,155 A * | 1/1998 | DeVilbiss et al. | 62/3.7 |
| 5,816,063 A | 10/1998 | Schulak et al. | |
| 5,871,041 A | 2/1999 | Rafalovich et al. | |
| 6,059,016 A | 5/2000 | Rafalovich et al. | |
| 6,209,343 B1 | 4/2001 | Owen | |
| 6,484,794 B1 | 11/2002 | Schulak et al. | |

FOREIGN PATENT DOCUMENTS

| | | |
|---|---|---|
| JP | 2001 010595 A | 5/2001 |
| JP | 02001330280 A | 11/2001 |
| WO | WO 2004/074750 A | 9/2004 |

OTHER PUBLICATIONS

Zafer Ure; *Eutectic Thermal Energy Storage Concept*; IEA Annex 10, Phase Charge Materials and Chemical Reactions for Thermal Energy Storage First Workshop; Apr. 1998; pp. 57-67; Adana, Turkey. Available at <http://www.ket.kth.se/Avdelningar/ts/annex10/WS_pres/ure_proc-final.pdf>.

The Internet: http://www.supercool.se/pages/calculate.html; *How to calculate your cooling requirements*; Downloaded: Mar. 7, 2003.

(Continued)

*Primary Examiner*—Chen Wen Jiang
(74) *Attorney, Agent, or Firm*—Alston & Bird LLP

(57) ABSTRACT

A system, apparatus, and method are provided for selectively actively and passively refrigerating one or more enclosures. The apparatus includes a primary heat sink that defines at least one surface configured to receive thermal energy from a gas in the enclosure so that the enclosure is refrigerated. First and second coolant heat sinks thermally communicate with the primary heat sink to remove thermal energy therefrom. For example, in a passive mode, a coolant is circulated through the first heat sink to cool the primary heat sink. In an active mode, the coolant is circulated through the second coolant heat sink and at least one heat pump is operated to transfer thermal energy from the primary heat sink to the coolant in the second coolant heat sink.

46 Claims, 13 Drawing Sheets

OTHER PUBLICATIONS

The Internet: http://www.supercool.se/pages/al.html; *Thermoelectric Air-to-Liquid systems*; Downloaded: Aug. 15, 2003.

The Internet: http://www.thermacore.com/embedded_heat_pipe.htm; *Embedded Heat Pipe*; Downloaded: Aug. 15, 2003.

The Internet: http://www.supercool.se/pages/productcode.html: *How to design your own thermoelectric system*; Downloaded: Aug. 15, 2003.

The Internet: http://www.supercool.se/pages/aa.html; *Thermoelectric Air-to-Air systems*; Downloaded: Aug. 15, 2003.

The Internet: http://www.supercool.se/pages/da.html; *Thermoelectric Direct-to-Air systems*; Downloaded: Aug. 15, 2003.

The Internet: http://www.supercool.se/pages/dl.html; *Thermoelectric Direct-to-Liquid systems*; Downloaded: Aug. 15, 2003.

The Internet: http://www.supercool.se/pages/la.html; *Thermoelectric Liquid-to-Air systems*; Downloaded: Aug. 15, 2003.

The Internet: http://www.supercool.se/pages/ll.html; *Thermoelectric Liquid-to-Liquid systems*; Downloaded: Aug. 15, 2003.

Dale Mehl; *Vapor Chamber Heat Sinks Eliminate Hot Spots*; Available at http://www.thermacore.com/pdfs/vapor.pdf; Downloaded: Aug. 15, 2003.

The Internet: http://www.aavidthermalloy.com/technical/papers/aircooled.shtml; *Augmented-Fin Air-Cooled Heat Sinks*; Downloaded: Mar. 10, 2003.

The Internet: http://www.aavidthermalloy.com/products/bondfin/augfin.shtml; *Augmented Surface*; Downloaded: Mar. 10, 2003.

PCT International Search Report filed on Form PCT/ISA/210, International Application No. PCT/US2004/025760, International Filing Date Oct. 8, 2004, File Reference 03-1055, Applicant—The Boeing Company.

* cited by examiner

SYSTEM, APPARATUS, AND METHOD FOR PASSIVE AND ACTIVE REFRIGERATION OF AT LEAST ONE ENCLOSURE

BACKGROUND OF THE INVENTION

1) Field of the Invention

The present invention relates to the cooling of enclosures and, more particularly, to integrated apparatuses and methods for selective passive and active refrigeration of enclosures such as refrigerator and freezer devices.

2) Description of Related Art

In many industries employing refrigeration systems, such as the airline, trucking, shipping, and building industries, conventional refrigeration technology is based on the vapor-compression cycle. In aircraft, for example, a vapor-compression cycle air chiller is typically mounted either on top of a galley of the aircraft, such as in the crown area, or below the cabin floor, such as in the cargo area between floor beams. To cool consumables such as food and beverages, the air chiller is typically connected to one or more galley food storage compartments via a series of air supply/return ducts, which collectively form a closed-loop system. In operation, the air chiller is essentially a unitized air conditioner similar in principle to a conventional window-unit air conditioner typically mounted in a window of a house. In some cases, the objective is to maintain the temperature of the consumables between 0° C. and 7° C., or between 0° C. and 5° C. (or 4° C. in many European countries) as may be required in the future.

In order to maintain the consumables at a temperature within the proper temperature range, a desired temperature difference must exist between the warmer aircraft cabin atmosphere and the cooler galley food storage compartments atmosphere. This temperature difference causes heat energy in the warmer aircraft cabin to flow into the cooler galley food storage compartments via a combination of heat transfer mechanisms. Conventionally, the rate of this heat transfer (or heat load) at any given temperature differential is governed by the effective net insulation between the warm and the cool atmospheres. In this regard, the vapor-compression cycle air chiller typically must be able to remove this heat load from the cooler food storage compartments in order to maintain the desired temperature differential, thereby keeping the consumables at a temperature within the proper temperature range. The heat removed by the air chiller is rejected to the atmosphere in either the airplane cargo compartment or the cabin crown, depending on the location of the air chiller.

Conventionally, the vapor-compression cycle air chiller is an air-to-air system. In this regard, a fan in the air chiller unit circulates air from the galley food storage compartments via the air return ducts across an evaporator coil mounted inside the air chiller. Inside the evaporator coil, cold coolant, such as cold R134a refrigerant (gas phase), soaks up the heat from the air flowing across the evaporator coil. As the air flows across the evaporator coil, the air loses heat energy to the coolant. The cold air is then circulated back into the galley food storage compartments via the air supply ducts. Once inside the galley food storage compartments, the cold air soaks up the heat energy inside the food storage compartments. The process can then be repeated in a continuous manner in order to maintain the desired temperature differential.

As will be appreciated, once the coolant receives the heat energy from the air flowing across the evaporator coil, the heat energy must be rejected from the coolant. In this regard, the gaseous coolant becomes superheated as it soaks up the heat energy through the evaporator coil. The superheated gaseous coolant is then typically drawn into a compressor within the air chiller. The compressor then does work on the gaseous coolant by forcing the gaseous coolant into a smaller volume by applying external pressure. As a result, the temperature and pressure of the gaseous coolant is greatly increased. The high temperature and pressure gaseous refrigerant is then circulated through a condenser located in the air chiller unit. As the gaseous refrigerant flows through the condenser coil, a fan blows ambient air across the condenser coil to cool the hot, gaseous refrigerant. As the refrigerant circulates through the condenser coil, it loses heat energy to the ambient air such that the refrigerant changes state from a high-pressure, super-heated gas to a saturated high-pressure liquid as it leaves the condenser coil and enters a liquid receiver. The liquid refrigerant travels through the high-pressure liquid line to an expansion valve (or in some systems, a capillary tube) and is expanded into a saturated gas before it re-enters the evaporator coil.

Whereas refrigeration systems employing vapor-compression cycle air chillers are adequate for maintaining consumables at a temperature within the proper temperature range, such refrigeration systems have drawbacks. In this regard, the heart of the vapor-compression cycle air chiller is the compressor. Operation of the compressor as well as the fan blowing air across the condenser, however, undesirably consumes significant amounts of electrical energy. Also, the compressor is typically a complicated mechanical device, which is noisy and prone to failure. In addition, operation of the air-chiller rejects heat into the cabin environment, which can be problematic for the environmental control system (ECS) during ground operations. In this regard, ECS packs that provide cooling to the airplane cabin and equipment during ground operation are typically located under the airplane wing box, which stores airplane fuel. As such, the harder the ECS system has to work in hot climates, the more heat the ECS system rejects into the airplane fuel.

To overcome the drawbacks of conventional vapor-compression cycle air chiller systems, systems and methods have been developed that are capable of refrigerating one or more enclosures utilizing the "free" thermal potential provided by the natural cold heat sink of a vehicle or system with which the system is operated. Once such system is described in U.S. patent application Ser. No. 10/369,441, entitled "System and Method of Refrigerating at least one Enclosure," filed Feb. 19, 2003 and assigned to the Assignee of the present application. As disclosed in U.S. patent application Ser. No. 10/369,441, the system and method for refrigerating enclosures are based on a hybrid refrigeration methodology capable of integrating passive and active cooling technologies to provide continuous refrigeration to enclosures, such as aircraft galley carts. Advantageously, the apparatuses and methods of embodiments of the present invention are capable of achieving an optimal balance between the refrigeration capability of such a system and the changing operational environment of the cold heat sink. As such, enclosures such as galley carts on aircraft can be refrigerated without the use of a vapor-compression cycle air chiller, thereby avoiding the drawbacks of vapor-compression cycle air chillers. Although U.S. patent application Ser. No. 10/369,441 provides an improved system and method for refrigerating enclosures, it is always desirable to further improve such systems and methods.

BRIEF SUMMARY OF THE INVENTION

In light of the foregoing background, embodiments of the present invention provide an apparatus and method for cooling or refrigerating an enclosure. The apparatus can selectively cool the enclosure in active and passive modes. Advantageously, both active and passive refrigeration can be achieved via a common primary heat sink in thermal communication with a gas in the enclosure.

According to one embodiment of the present invention, the apparatus includes the primary heat sink, which defines fins or another surface for receiving thermal energy from a gas in the enclosure. For example, a fan can be provided for circulating the air in or through the enclosure to the primary heat sink and thereby transferring thermal energy to the primary heat sink. First and second coolant heat sinks are in thermal communication with the primary heat sink and each defines at least one passage for circulating a coolant. In particular, the second coolant heat sink is in thermal communication with the primary heat sink via one or more heat pumps, such as thermionic, thermoelectric, or thermionic-thermoelectric hybrid heat pumps.

Each of the first and second coolant heat sinks can be fluidly connected to one or more cooling device for cooling the coolant. For example, the cooling devices can be configured to reject heat to a cold sink such as a portion of an aircraft fuselage skin structure. Additionally, or alternatively, a eutectic thermal battery can be provided as a cooling device.

The present invention also provides a system including one or more of the apparatuses for cooling one or more enclosures. Each apparatus can be configured to operate selectively in passive and active modes. In the passive mode, the coolant is circulated through the first coolant heat sink such that thermal energy is transferred from the primary heat sink to the coolant. In the active mode, the coolant is circulated through the second coolant heat sink and the at least one heat pump is operated so that thermal energy is transferred from the primary heat sink to the coolant via the heat pump. Further, in direct passive and active modes, the coolant can be circulated through a first of the cooling devices, such as a device configured to reject heat to an aircraft fuselage skin structure. In indirect passive and active modes, the coolant can be circulated through a different cooling device such as a eutectic thermal battery. Thus, the apparatus can refrigerate the enclosure to a desired temperature, e.g., below about 7° C. or below about 0° C., in either the passive or the active modes.

The eutectic thermal battery can also be cooled, or recharged, by thermally connecting the battery to the first cooling device and thereby transferring heat from the battery to the first cooling device. In addition, a store of compressed inert fluid can be provided and expanded, e.g., through an evaporation coil, to cool the thermal battery.

The present invention also provides a method for selectively refrigerating an enclosure in passive and active modes. Thermal energy from the enclosure is absorbed by the primary heat sink, thereby refrigerating the enclosure. The primary heat sink, in turn, is cooled by circulating coolant through a first or second coolant heat sink. In the passive mode of operation, coolant can be circulated through either the first coolant heat sink or the second coolant heat sink, in thermal communication with the primary heat sink, thereby cooling the primary heat sink. In the active modes, a heat pump in thermal communication with the primary heat sink is operated and coolant is circulated through the second coolant heat sink in thermal communication with the primary heat sink via the heat pump.

The coolant can be circulated through one or more cooling devices to cool the coolants. For example, in direct passive and active modes of operation, the coolant can be circulated through a cooling device in thermal communication with an aircraft skin structure or other cold sink, and in indirect passive and active modes of operation, the coolant can be circulated through a eutectic thermal battery. The battery can be cooled, or recharged, by rejecting heat therefrom to a cold sink such as the aircraft skin structure. Further, a compressed fluid can be expanded to cool the eutectic thermal battery.

BRIEF DESCRIPTION OF THE SEVERAL VIEWS OF THE DRAWINGS

Figure 1:
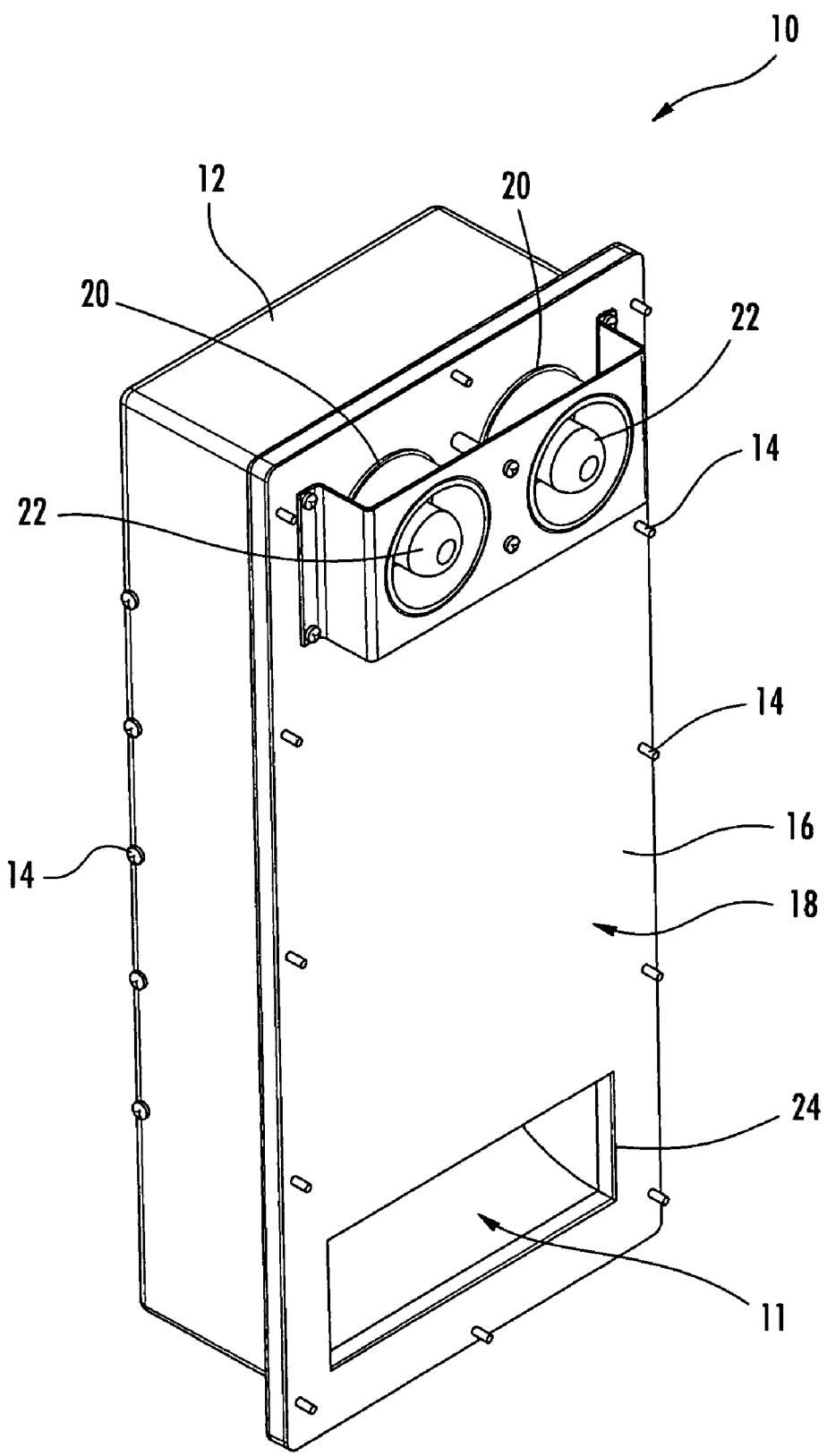
Figure 2:
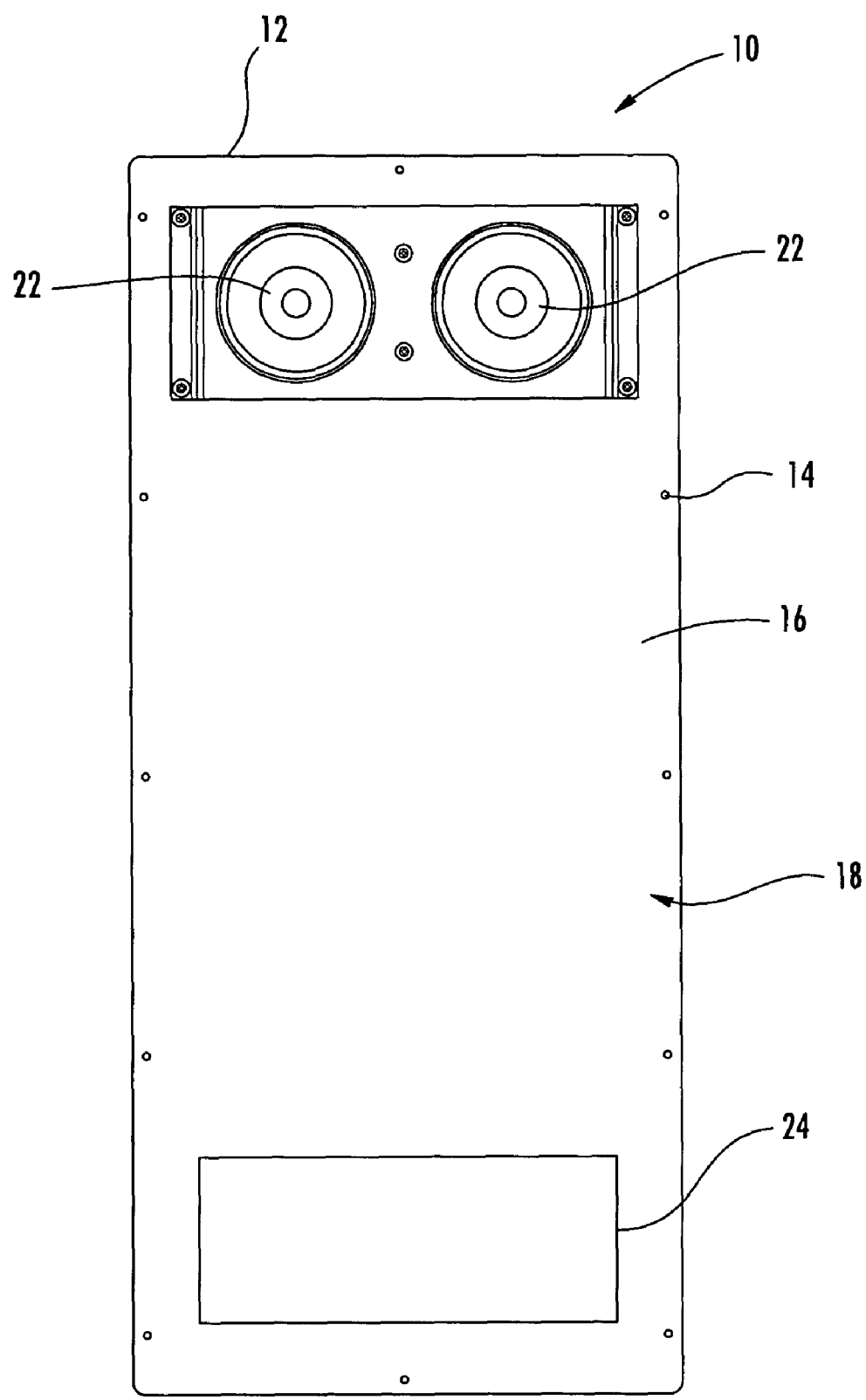
Figure 3:
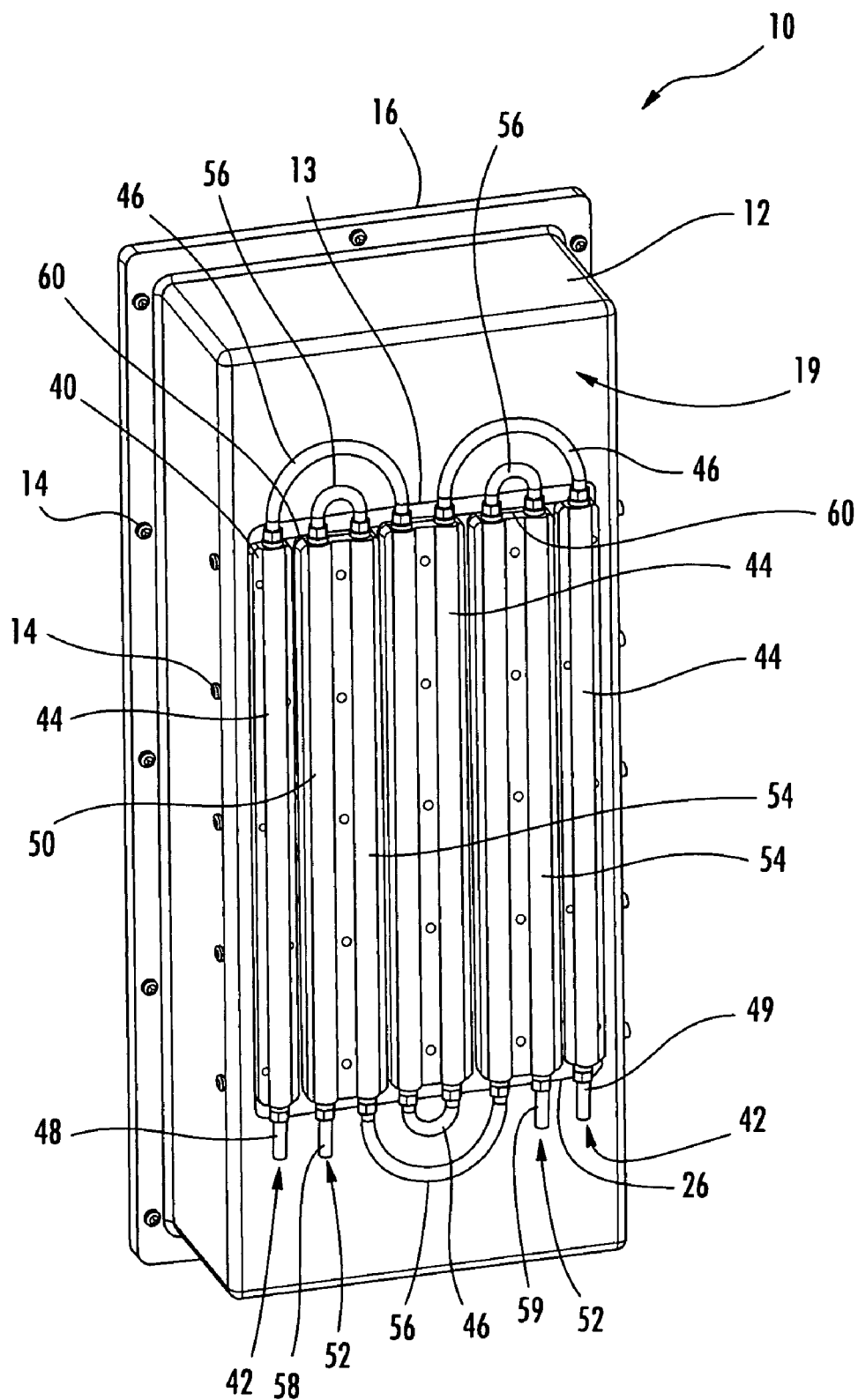
Figure 4:
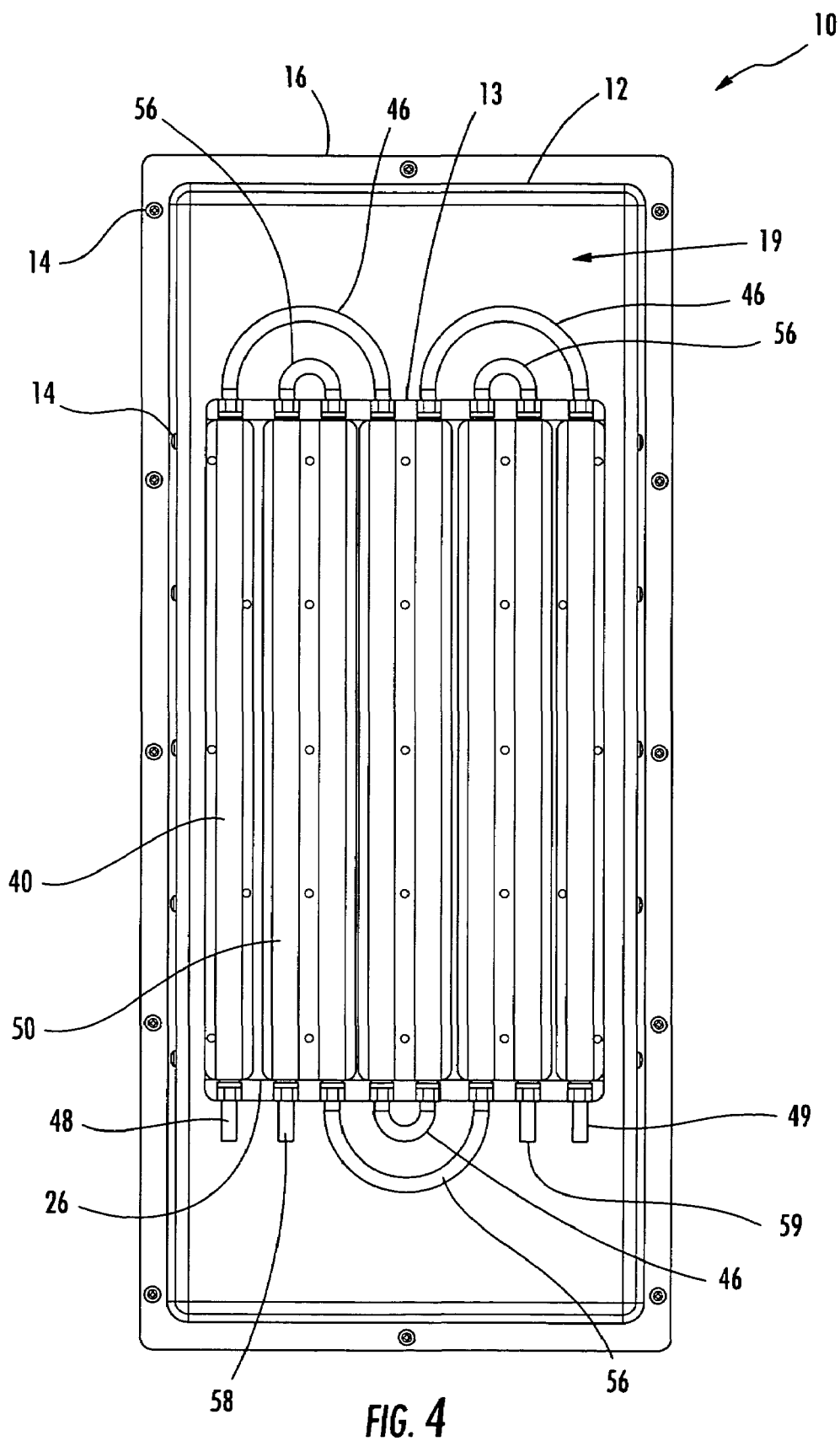
Figure 5:
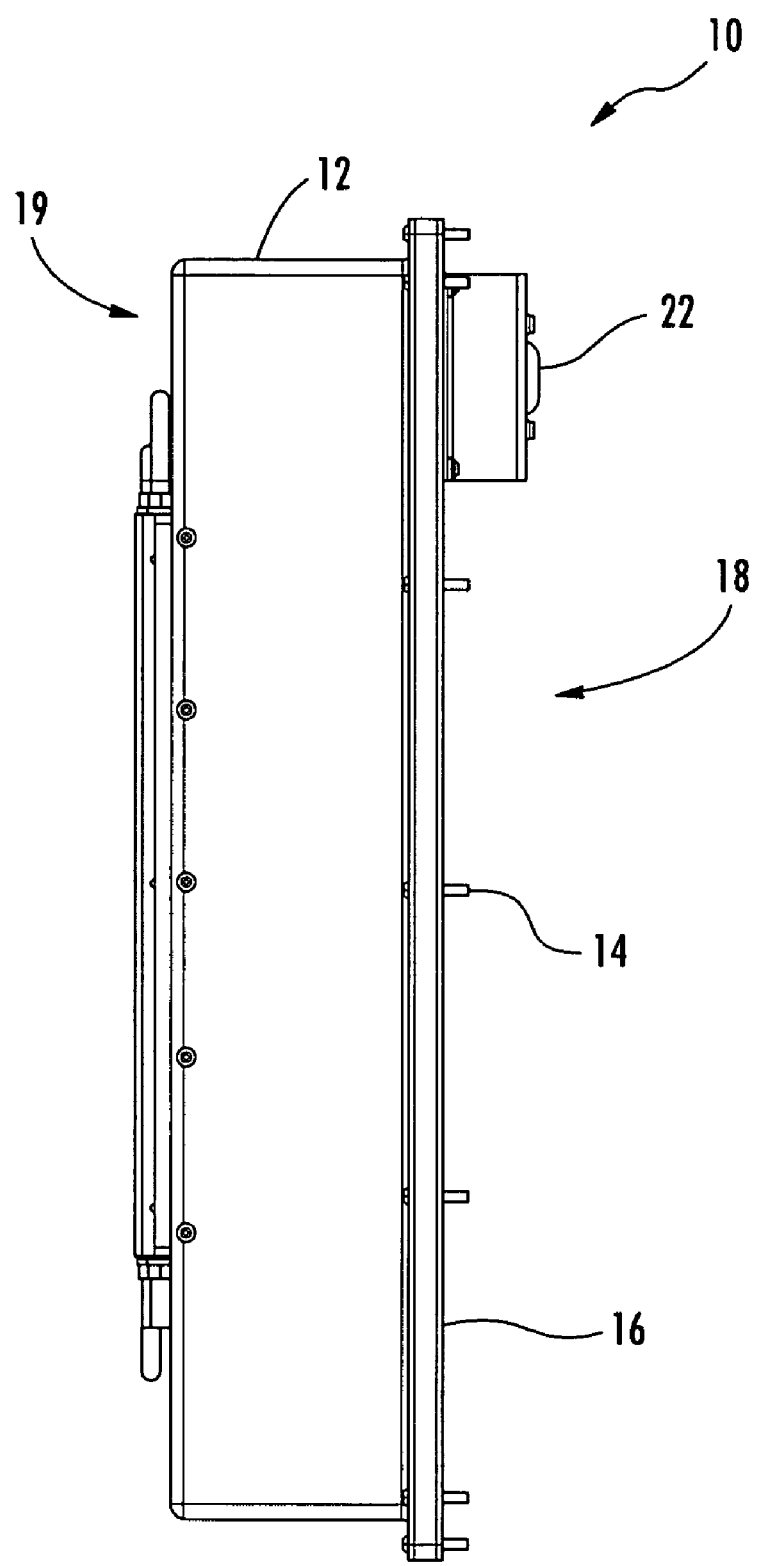
Figure 6:
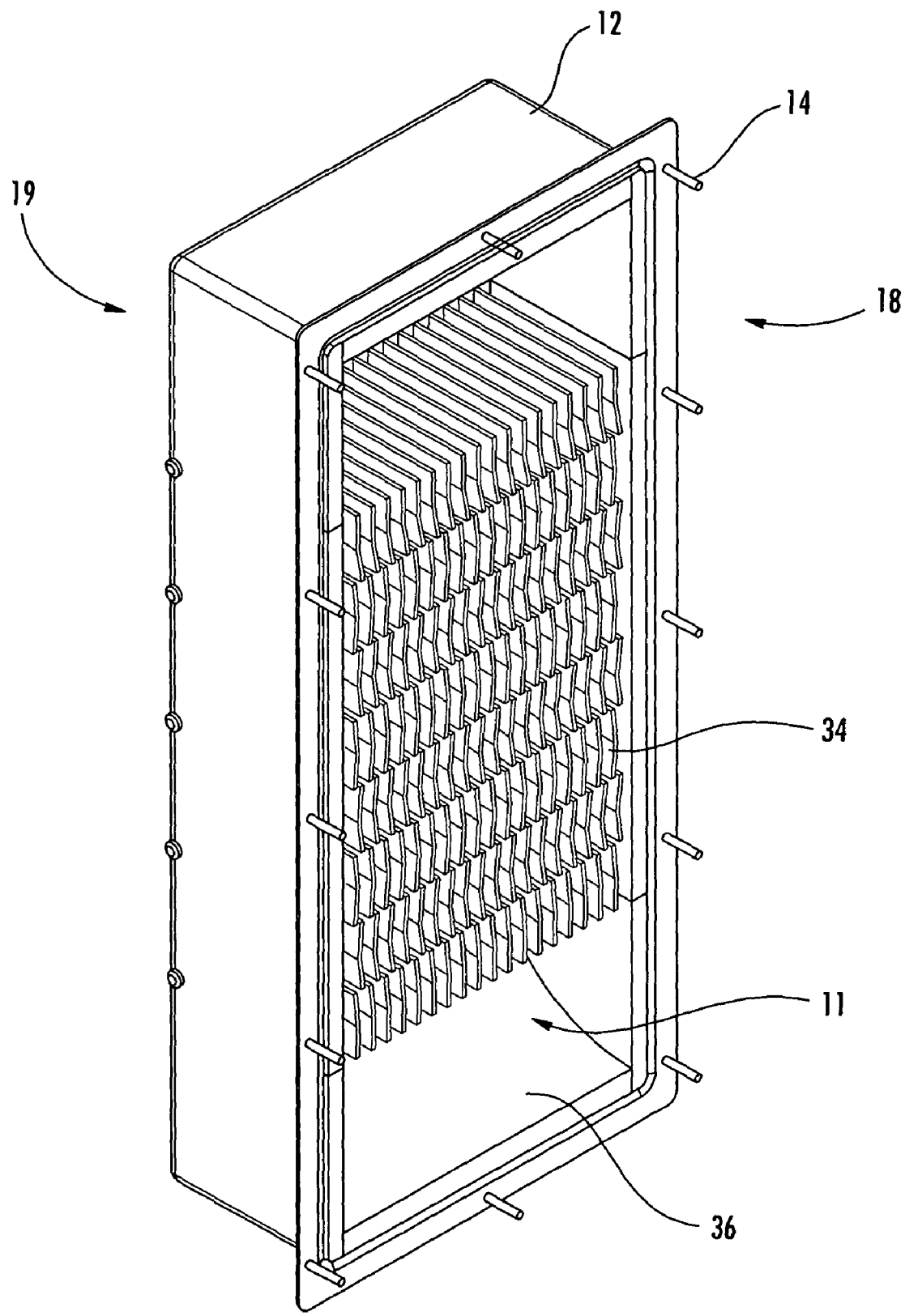
Figure 7:
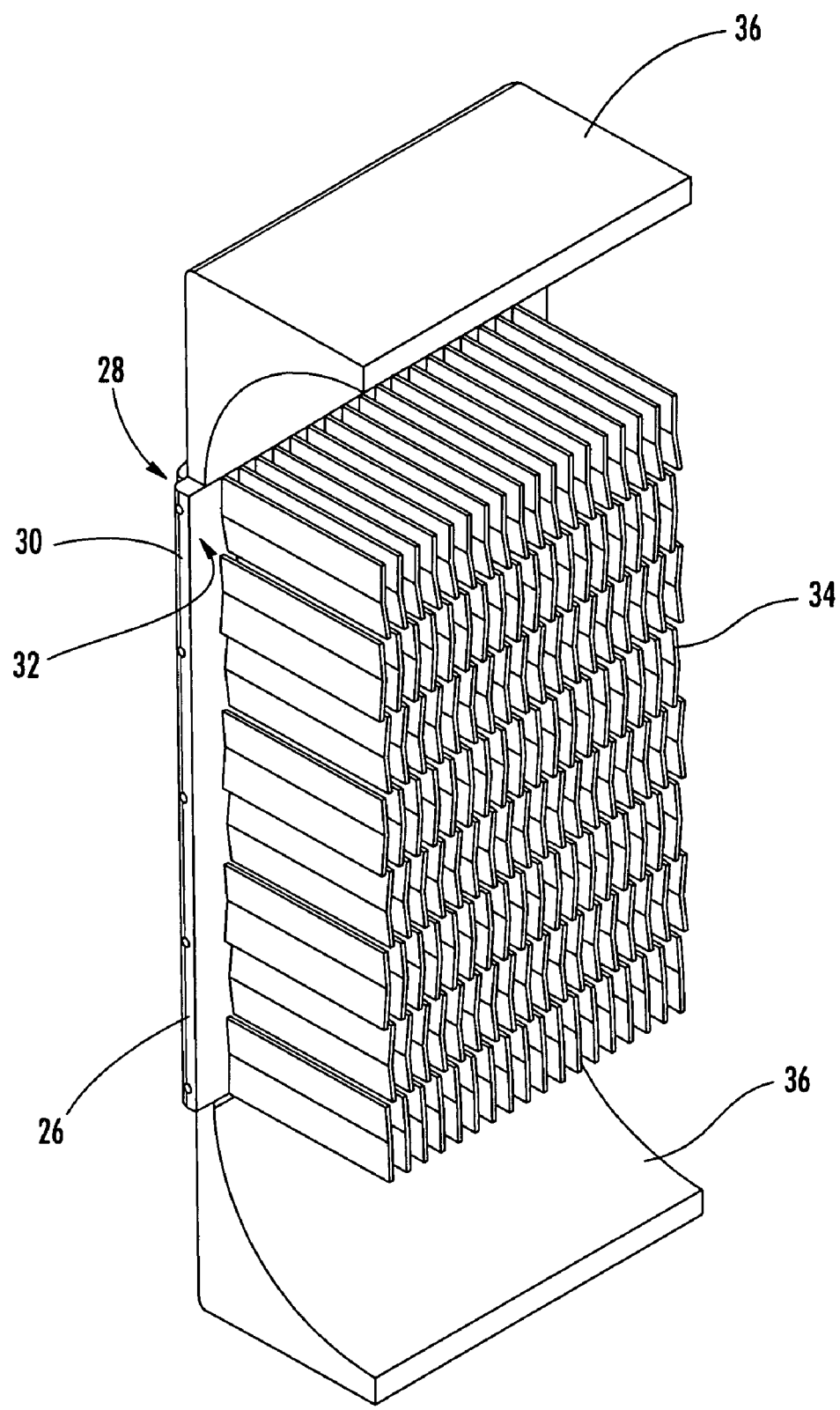
Figure 8:
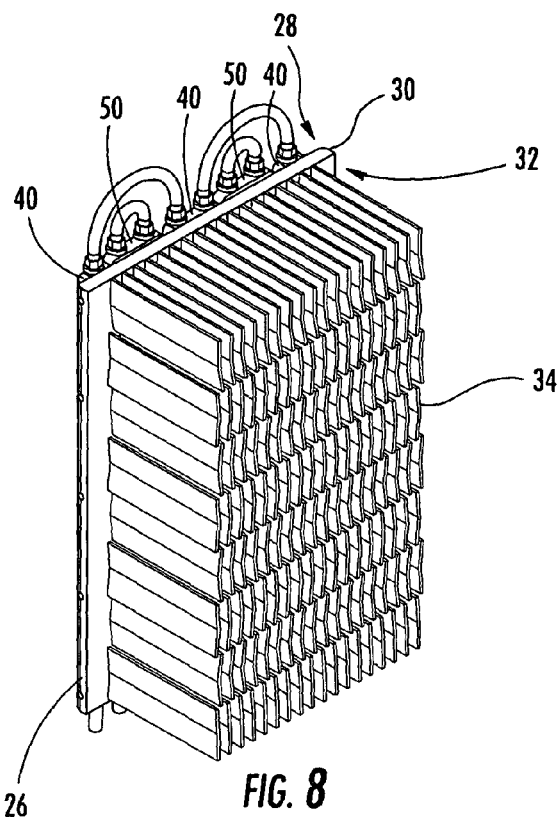
Figure 9:
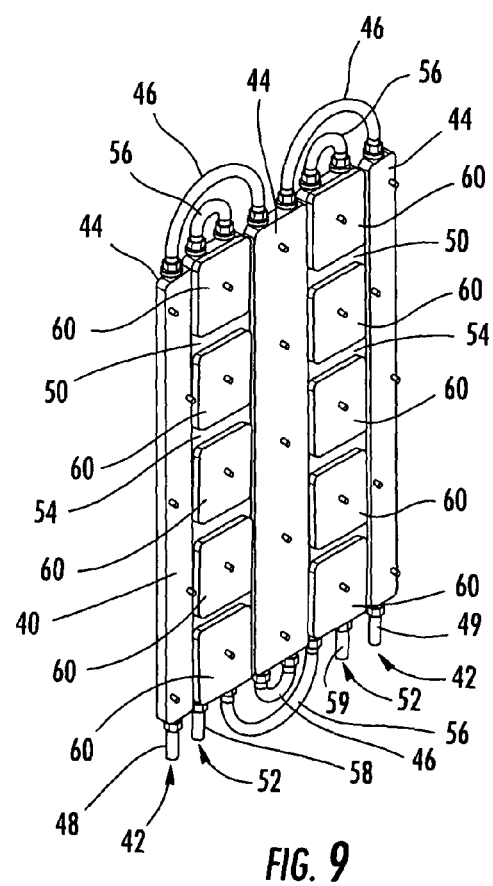
Figure 10:
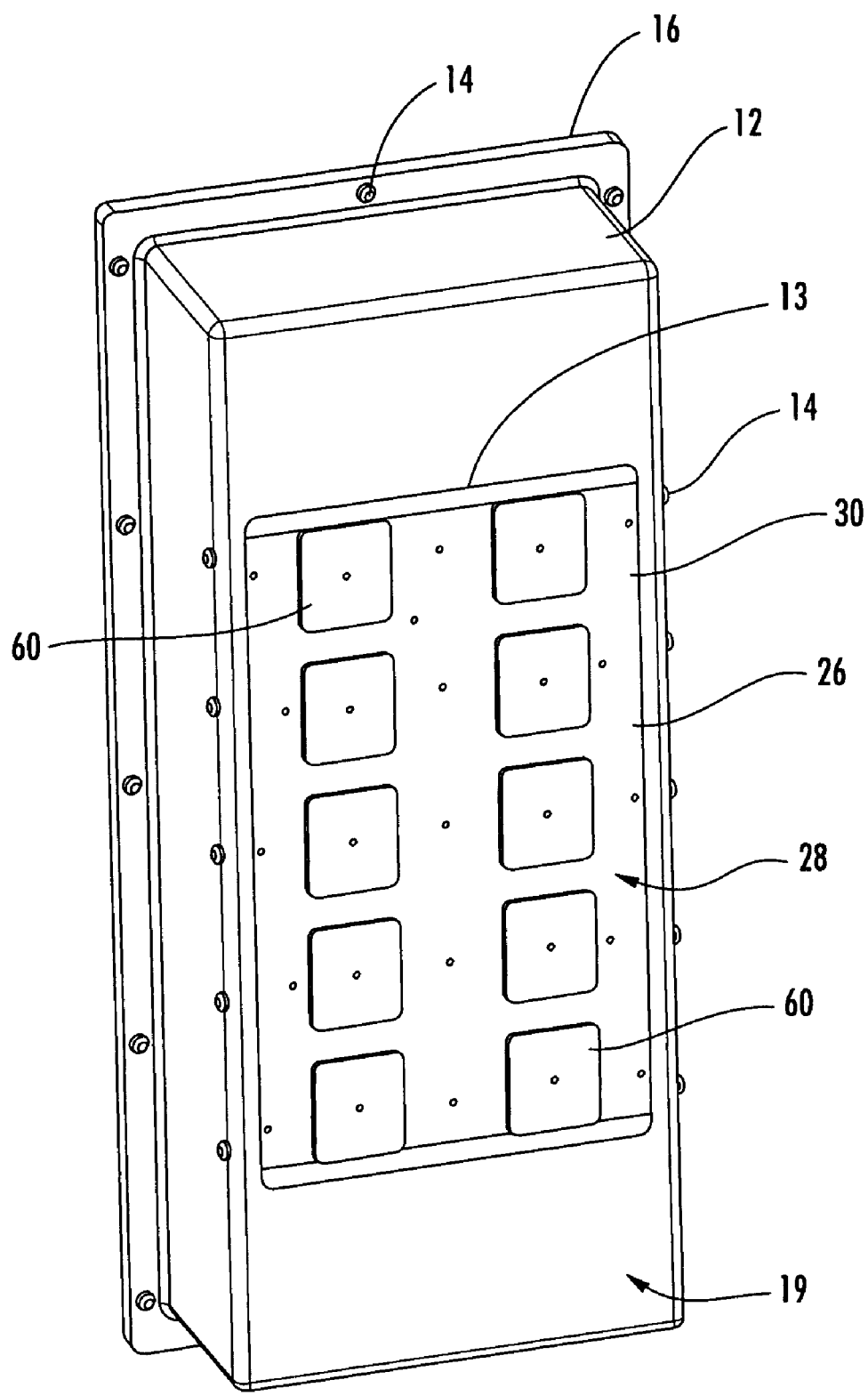
Figure 11:
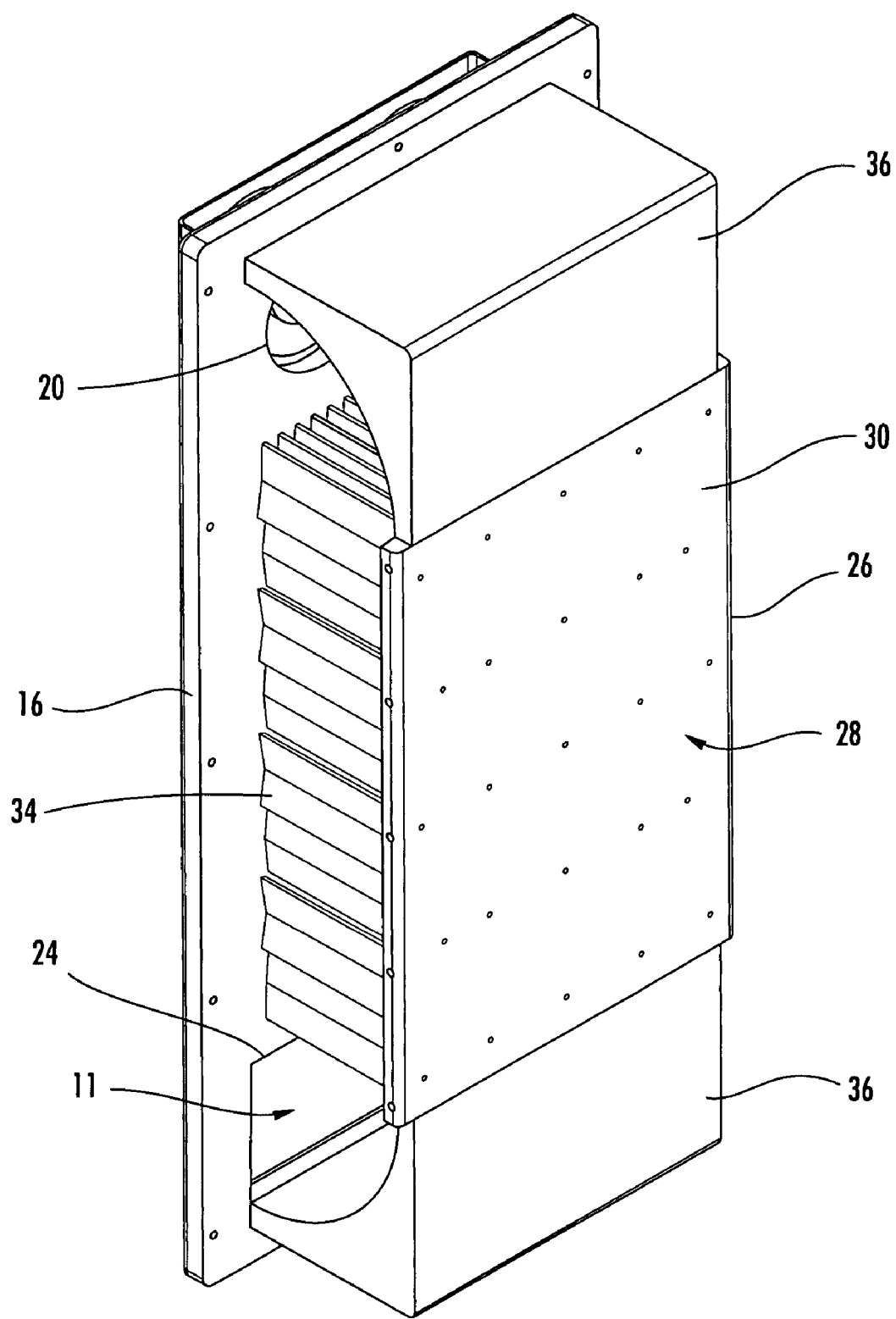
Figure 12:
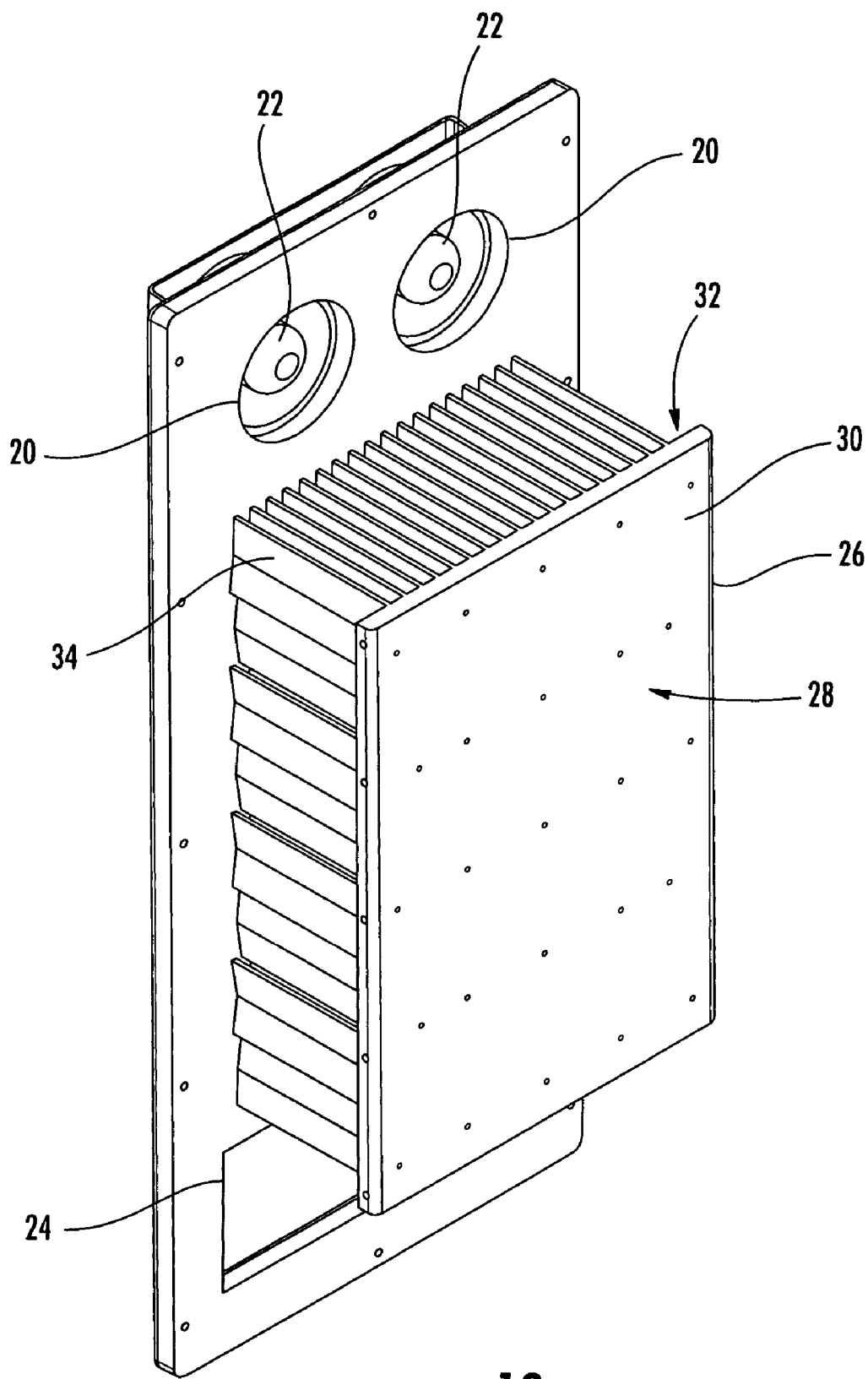
Figure 13:
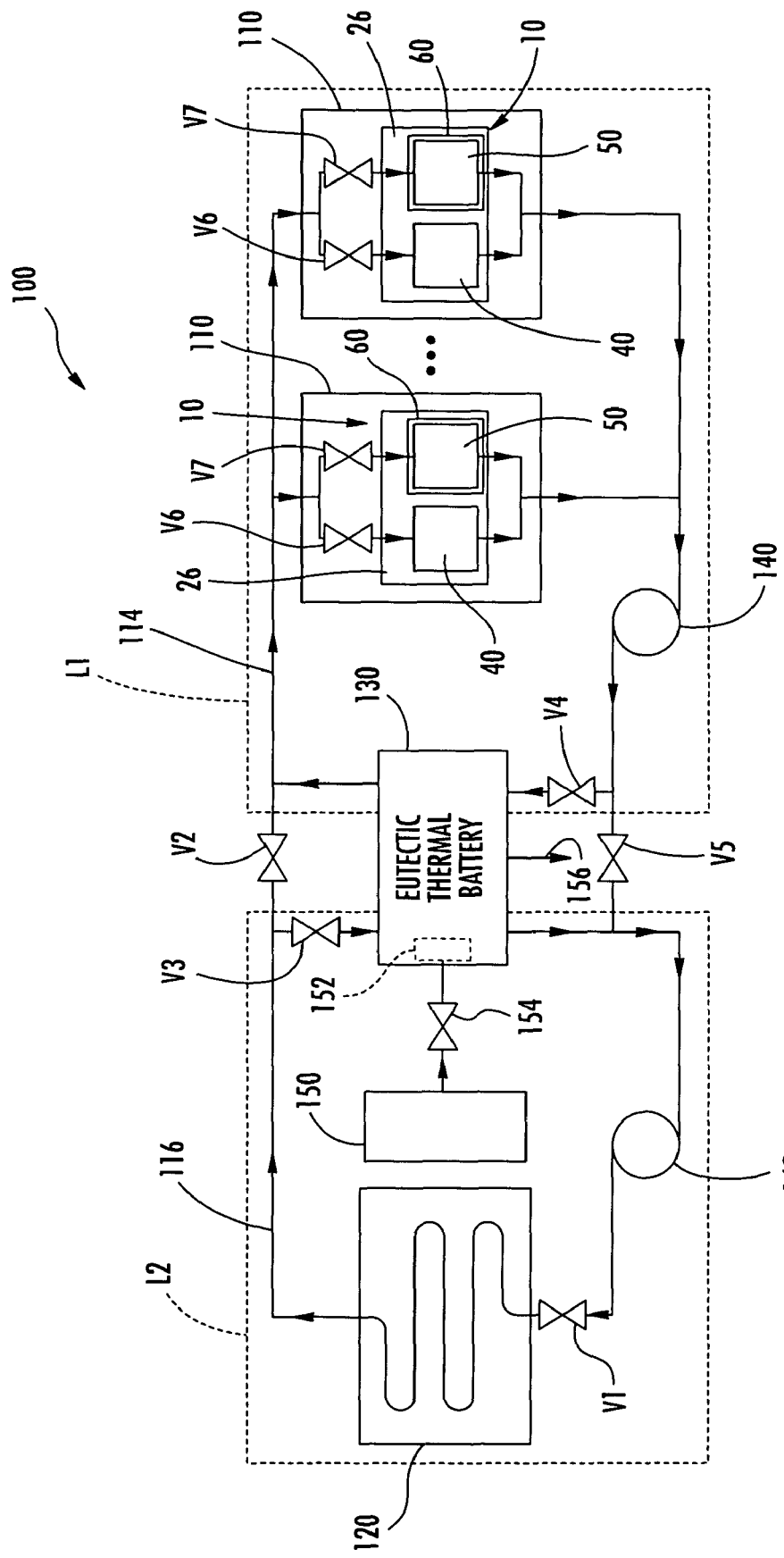
Figure 14:
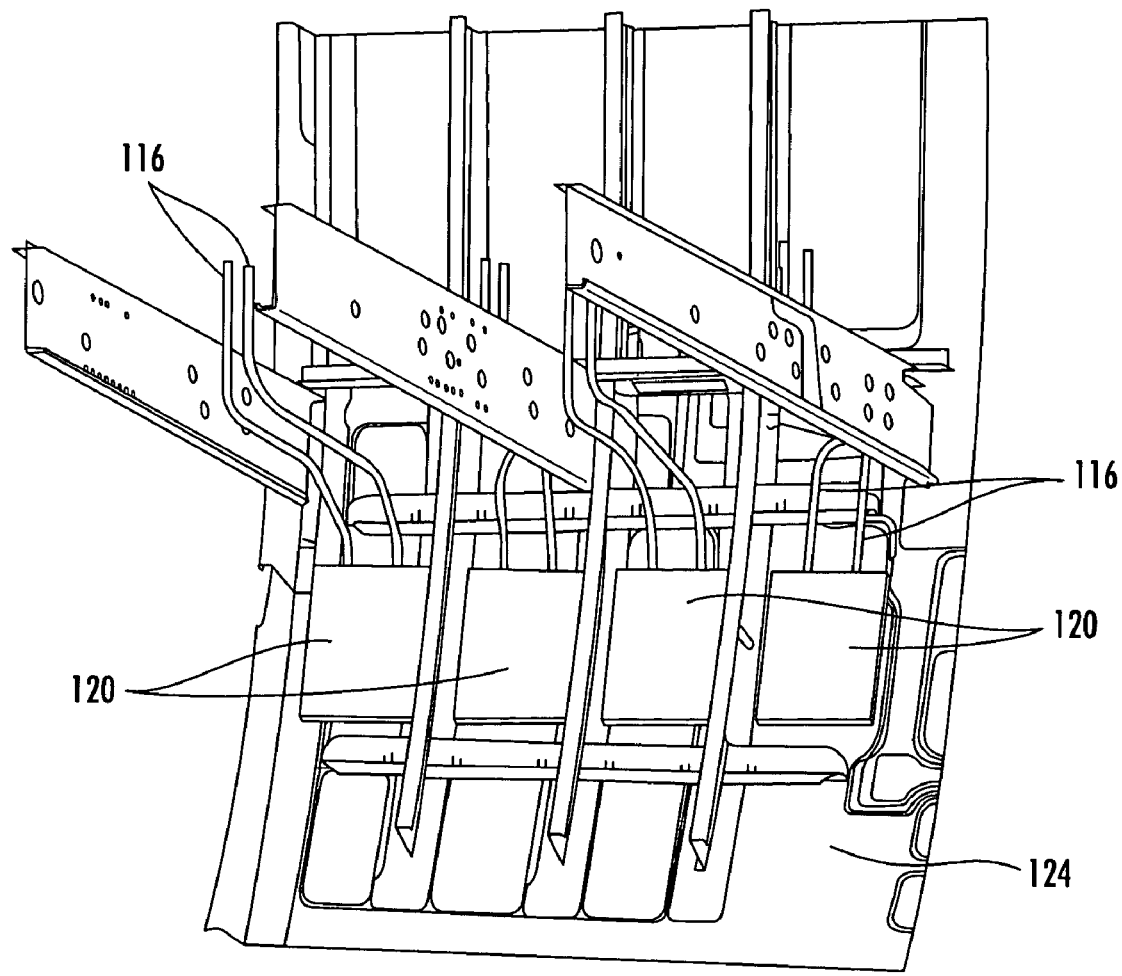

Having thus described the invention in general terms, reference will now be made to the accompanying drawings, which are not necessarily drawn to scale, and wherein:

FIG. 1 is a perspective view illustrating an apparatus for refrigerating an enclosure according to one embodiment of the present invention;

FIG. 2 is an elevation view of the apparatus of FIG. 1, illustrating the first side of the apparatus;

FIG. 3 is another perspective view of the apparatus of FIG. 1, illustrating the primary heat sink and first and second coolant heat sinks on the second side of the apparatus;

FIG. 4 is an elevation view of the apparatus of FIG. 1, illustrating the second side of the apparatus;

FIG. 5 is an elevation view of the apparatus of FIG. 1, as seen from the right side of FIG. 4;

FIG. 6 is a perspective view of the apparatus of FIG. 1 with the panel removed from the first side, illustrating the interior of the apparatus;

FIG. 7 is a perspective view of the primary heat sink and foam inserts of the apparatus of FIG. 1;

FIG. 8 is a perspective view of the primary heat sink and first and second coolant heat sinks of the apparatus of FIG. 1;

FIG. 9 is a perspective view of the first and second coolant heat sinks of the apparatus of FIG. 1;

FIG. 10 is a perspective view of the apparatus of FIG. 1, as seen with the first and second coolant heat sinks removed therefrom;

FIG. 11 is a perspective view of the primary heat sink, foam inserts, and panel of the apparatus of FIG. 1;

FIG. 12 is a perspective view of the primary heat sink and panel of the apparatus of FIG. 1;

FIG. 13 is a schematic diagram illustrating a system for refrigerating an enclosure according to one embodiment of the present invention; and FIG. 14 is a perspective view illustrating four cooling devices of the system of FIG. 13, in which the cooling devices are configured to reject heat to a cold sink comprising an inner surface of an aircraft fuselage skin structure.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide an apparatus, system, and method of refrigerating at least one enclosure. As described herein, the apparatus, system, and method are utilized within an aircraft to refrigerate one or more galley food storage compartments. The apparatus, system, and method are therefore particularly advantageous for cooling consumables, such as food and beverages, in an aircraft. It should be appreciated, however, that the apparatus, system, and method can be utilized in other vehicles or with other systems, without departing from the spirit and scope of the present invention. In this regard, the apparatus, system, and method can be utilized in any of a number of other vehicles or with other systems capable of providing a cold heat sink in a manner similar to that described below.

Advantageously, embodiments of the present invention are capable of operating in a number of different modes to provide the most cost effective and efficient refrigeration of the enclosure(s). In this regard, embodiments of the present invention are capable of operating with an already existing cold heat sink in the vehicle or other system within which the invention is utilized to provide passive or active refrigeration of the enclosure(s). As utilized in aircraft, for example, the system is capable of operating with the aircraft fuselage skin structure acting as the cold heat sink, as well as a separate liquid coolant chiller or a eutectic thermal battery as disclosed in U.S. patent application Ser. No. 10/369,441.

Typically, the temperature of the aluminum fuselage skin structure of a commercial jet aircraft during normal high altitude cruising is between approximately +16° F. and −59° F. Such a super cold skin temperature enables the fuselage skin to function as a powerful cold heat sink. Thus, when the fuselage skin has a temperature low enough to act as a cold heat sink, such as during flight, embodiments of the present invention can passively refrigerate the enclosures by utilizing the fuselage skin. When the fuselage skin does not have a temperature low enough to provide an effective heat sink, such as while an aircraft is on the ground, embodiments of the present invention are capable of actively and/or passively refrigerating the enclosures. Embodiments of the present invention can therefore provide continuous refrigeration of the enclosures until such time as the temperature of the fuselage skin decreases to a point that the fuselage skin can act as an effective heat sink.

Referring now to FIGS. 1–12, there is shown an apparatus 10, and components thereof, for refrigerating at least one enclosure according to one embodiment of the present invention where the apparatus 10 operates within an aircraft, and where the enclosures comprise galley food storage compartments. It should be appreciated, however, that even operating the apparatus 10 within an aircraft, the enclosures can comprise any of a number of other enclosures without departing from the spirit and scope of the invention.

As shown in FIG. 1, the apparatus 10 includes a housing 12 and a plurality of fasteners 14, such as screws or bolts, for connecting the various portions of the apparatus 10 and for connecting the apparatus 10 to the enclosure. The housing 12 can be formed of a variety of materials including polymers, composites, metals, and the like. In addition, insulating materials, such as insulative foam, can be provided on the inner or outer surfaces of the housing 12. A panel 16, shown in FIGS. 1 and 2, defines a first side 18 of the housing 12. The panel 16 defines one or more inlet apertures 20 through which fans 22 circulate air (or other gas) from within the enclosure for cooling. The panel 16 also defines an exit aperture 24 through which the cooled air can return to the interior of the enclosure.

A primary heat sink 26 of the apparatus 10, shown in FIG. 3–5, is disposed on a second side 19 of the apparatus 10, opposite the panel 16. The primary heat sink 26 is configured to absorb thermal energy from the air in the apparatus 10, thereby cooling the air and heating the primary heat sink 26. The primary heat sink 26, in turn, is cooled by either of first and second coolants that flow through first and second coolant heat sinks 40, 50, respectively. As shown in FIGS. 8 and 9, the first coolant heat sink 40 includes three portions 44, and the second coolant heat sink 50 includes two portions 54. In particular, the first and second coolant heat sinks 40, 50 are disposed on a first side 28 of a base 30 of the primary heat sink 26, and an opposite side 32 of the base 30 faces the interior 11 of the apparatus 10, shown in FIGS. 6–8. A plurality of fins 34 extend from the side 32 of the base 30 of the primary heat sink 26 into the interior 11 of the apparatus 10. The fins 34 can be elongate vane members such as the "augmented" fins illustrated in FIGS. 6–8, rod-like members, or other fin shapes that are used in conventional heat exchange devices.

Thus, air circulating through the apertures 20, 24 of the housing 12 passes between the fins 34, convectively warming the fins 34, which conduct heat to the base 30 and the coolant heat sinks 40, 50. The air can be directed through the interior 11 of the apparatus 10 by foam inserts 36 or other guiding devices. For purposes of illustrative clarity, the fins 34 are shown with and without the foam inserts 36 in FIGS. 11 and 12, respectively. The primary heat sink 26 can be a vapor chamber heat sink, i.e., a heat sink defining an internal vapor chamber containing a suitable fluid in a vacuum or partial vacuum. A wicking structure can be provided on the inner surface of the vapor chamber such that heating of a portion of the heat sink 26 results in vaporization of the fluid proximate to the application of heat, the vapor then condensing elsewhere in the chamber and thereby distributing the heat. Alternatively, the primary heat sink 26 can be a solid member, formed of metal or other thermally conductive materials and utilizing embedded heat pipes to even out the temperature distribution on the heat sink base. In any case, the base 30 is thermally conductive so that thermal energy conducted to the base 30 by the fins 34 is then conducted by the base 30 to the first and second coolant heat sinks 40, 50. In other embodiments of the present invention, the primary heat sink 26 can include a heat pump embedded in the base 30 such that the heat pump is configured to reject heat from the fins 34 to the base 30.

Each of the sinks 40, 50 defines at least one passage 42, 52 for receiving a coolant therethrough. For example, as shown in FIGS. 8 and 9, the first coolant heat sink 40 includes three portions 44, each of which defines at least one passage 42 extending therethrough. Hoses, pipes, or other fluid connection devices 46 connect the passages 42 to form a continuous fluid circuit, though in other embodiments of the present invention, multiple parallel circuits can be formed. Thus, coolant can enter the first coolant heat sink 40 through an inlet 48, flow through the first coolant heat sink 40, and exit the heat sink 40 through an outlet 49. The first coolant heat sink 40 is in thermal communication with the primary heat sink 26 and therefore the coolant is heated in the first coolant heat sink 40, thereby cooling the heat sinks 26, 40.

In the illustrated embodiment, the second coolant heat sink 50 includes two portions 54 (FIG. 3), each defining at least one passage 52 extending therethrough. The passages 52 are connected by fluid connection devices 56 so that the coolant can enter the second coolant heat sink through an inlet 58, flow through the second coolant heat sink 50, and exit through an outlet 59. The second coolant heat sink 50 is in thermal communication with the primary heat sink 26 via one or more heat pumps 60 (FIGS. 3, 9), i.e., the heat pumps 60 are configured to actively transfer thermal energy from the primary heat sink 26 to the second coolant heat sink 50 and the second coolant, thereby cooling the primary heat sink 26.

The heat pumps 60 suited for this application are flat shaped solid state heat pumps, which can be thermoelectric devices, thermionic devices, or a combination thereof. In any case, the heat pumps are preferably configured to actively transfer thermal energy from the primary heat sink 26 to the second coolant heat sink 50 and, hence, the coolant, i.e., even if the coolant and the second coolant heat sink 50 are warmer than the primary heat sink 26. For example, the heat pumps 60 can comprise any of a number of different liquid-to-direct heat pumps manufactured by Supercool AB of Göteborg, Sweden. Alternatively, the heat pumps 60 can be thermal diodes (such as those developed by ENECO Inc. of Salt Lake City, Utah), or thermionic heat pumps (such as those developed by Cool Chip PLC, a company registered in Gibraltar). Any number of flat-shaped solid state heat pumps 60 can be used.

The heat pumps 60 are disposed between the second coolant heat sink 50 and the primary heat sink 26, and the heat pumps 60 and the first coolant heat sink 40 are disposed against the primary heat sink 26 through an aperture 13 in the housing 12, shown in FIGS. 3 and 10. Thermal energy received by the primary heat sink 26 can be transferred to the coolant and carried by the coolant away from the apparatus 10, for example, to a cooling device configured to cool the coolant for recirculation or to otherwise provide cool coolant back to the apparatus 10. The cooling devices can be any of a variety of devices for absorbing thermal energy from the coolant fluid. For example, each cooling device can be a heat sink device that includes, or is in thermal communication with, the fuselage skin structure of an aircraft. The cooling device can alternatively be a eutectic cold storage device such as a eutectic thermal battery that can be charged, i.e., cooled, by the skin or another sink and subsequently used to cool the coolant fluids. A eutectic thermal battery and methods and systems using such a device are described in U.S. patent application Ser. No. 10/369,441, entitled "System and Method of Refrigerating at least one Enclosure," filed Feb. 19, 2003, the contents of which are incorporated herein by reference in its entirety. The cooling device can also be a chiller device, such as a centralized vapor-compression liquid chiller that chills liquid coolant for the aircraft's thermal management system.

Further, the coolant can be circulated selectively through multiple cooling devices. For example, in a passive mode, the coolant can be selectively circulated through a cooling device in thermal contact with the skin structure of the aircraft, a eutectic thermal battery, and a centralized liquid chiller. Thus, when the skin structure of the aircraft has a temperature sufficiently less than the temperature of the interior of the enclosure, the coolant can be circulated between the sink in contact with the skin structure and the first coolant heat sink 40. When the skin structure is too warm to sufficiently cool the coolant, the coolant can instead be circulated through the centralized air chiller or the eutectic thermal battery. In this manner, the coolant can be used to achieve passive cooling through the first coolant heat sink 40 whenever any one of the skin structure, the eutectic thermal battery, or the centralized liquid chiller is capable to cool the coolant and, hence, refrigerate the enclosure to the desired temperature. If none of the cooling devices are cool enough to passively refrigerate the enclosure to the desired temperature, the coolant can be circulated through the second coolant heat sink 50. A lower refrigeration temperature can generally be achieved by the circulation of the coolant due to the heat pumps 60 disposed between the second coolant heat sink 50 and the primary heat sink 26. The heat pumps 60 provide a temperature differential between the second coolant heat sink 50 and the primary heat sink 26, thereby achieving the desired temperature in the enclosure, even when the skin structure, centralized liquid chiller, eutectic thermal battery, and/or other cooling device are not cold enough, e.g., the skin structure, centralized liquid chiller, and eutectic thermal battery are warmer than the desired temperature of the enclosure or not cold enough to provide adequate cooling capacity.

For example, if the skin of the aircraft varies between a first temperature that is lower than the desired temperature in the enclosure and a second temperature that is higher than the desired temperature in the enclosure, the coolant can be cooled by the skin of the aircraft and circulated through the first coolant heat sink 40 to cool the enclosure when the skin is cooler than the desired temperature. Similarly, when the skin is warmer than the desired temperature, the coolant can be cooled by another cooling device, such as the centralized liquid chiller or the eutectic thermal battery, and circulated through the first coolant heat sink 40 to passively cool the primary heat sink 26. If each of the cooling devices is warmer than the desired temperature, the coolant can be circulated through the second coolant heat sink 50 to actively to cool the enclosure using the heat pumps 60. In addition, the eutectic thermal battery can be charged by the skin whenever the skin is cooler than the temperature of the eutectic thermal battery.

The desired temperature can vary depending on the use of the enclosure. For example, typical refrigeration on airplanes requires that the food storage enclosures are refrigerated to a temperature range of between about 0° C. and 5° C. In some cases, however, one or more of the enclosures may be used for freezing food items, thus requiring a colder temperature, e.g. between about 0° C. and −25° C. As described immediately above, the coolant can be circulated through the first coolant heat sink 40 to refrigerate the enclosure whenever one of the cooling devices is sufficiently cold, and otherwise the coolant can be circulated through the second coolant heat sink 50 while the heat pumps 60 are operated.

Referring now to FIG. 13, there is shown a schematic view of a system 100 according to one embodiment of the present invention, including a plurality of apparatuses 10, each apparatus 10 configured in the system 100 for cooling air in a respective enclosure 110. Each apparatus 10 includes a primary heat sink 26 and first and second coolant heat sinks 40, 50. As described above, the first and second coolant heat sinks 40, 50 are configured to receive a coolant for circulation therethrough, and the first and second coolant heat sinks 40, 50 are in thermal communication with the primary heat sink 26 of the respective apparatus 10, the second coolant heat sink 50 thermally communicating via the heat pumps 60. Thus, each apparatus 10 comprises an integrated liquid-to-direct heat pumping device 50 and liquid-to-direct heat exchanger 40 in communication with a common primary heat sink 26.

The system 100 includes first and second cooling devices 120, 130 for cooling the coolant. As illustrated, the first cooling device 120 can be a liquid-to-direct heat exchanger, which can be configured to reject heat to a cold sink such as the skin of the aircraft. Alternatively, the first cooling device 120 can also be a liquid-to-liquid heat exchanger for rejecting heat to a centralized liquid chiller device. The second cooling device 130 is a eutectic thermal battery. It is understood that additional and/or alternative cooling devices can be provided, and either or both of the illustrated cooling devices 120, 130 can be omitted. For example, the system 100 can include one or multiple cooling devices, each of which can be configured to reject heat to any type of cold sink device.

In addition, the system 100 includes a plurality of valves, such as valves V1, V2, V3, V4, V5, V6, and V7 as well as coolant pumps 140, 142, that allow the coolant to pass through various of the other elements of the system 100 during various modes of operation, as described below. Although not shown for clarity, it will be appreciated by those skilled in the art that the coolant pumps 140, 142 will typically also include coolant reservoirs for proper operation of the coolant pumps 140, 142. To allow coolant to pass through various of the other elements, the valves V1, V2, V3, V4, V5, V6, and V7 are connected to coolant ducts, pipes, or the like that interconnect the elements of the system 100. It is understood that other configurations of the ducts and components are possible. For example, while the first and second coolant heat sinks 40, 50 of each apparatus 10 are shown to be connected to a common circuit formed by the ducts 114 of loop L1, the first and second coolant heat sinks 40, 50 can alternatively be fluidly connected by separate ducts so that a first coolant circulated through the first coolant heat sink 40 is kept separate from a second coolant circulated through the second coolant heat sink 50. Further, the first and second coolant heat sinks 40, 50 can be fluidly connected to separate cooling devices. The coolant can comprise any of a number of different coolants such as, for example, 3M Novec Engineered Fluids manufactured by 3M Specialty Materials of St. Paul, Minn., or a suitable water-glycol mixture.

The eutectic thermal battery 130 functions within the system 100 as a thermal energy capacitor. More particularly, in one embodiment, the eutectic thermal battery 130 comprises a highly-insulated, two-pass cold-holding plate that contains a phase change material that has a predetermined freezing point. The phase change material can comprise any of a number of different materials having any of a number of different freezing points, such as between 0° C. and −40° C. As indicated above in the context of aircraft, the cold temperature of the fuselage skin enables the fuselage skin to function as a powerful cold heat sink. As such, the fuselage skin structure can be utilized to rapidly absorb latent heat from the phase change material inside the eutectic thermal battery 130, as described below. When the phase change material looses its latent heat to the cold heat sink, it changes phase from a liquid to a solid-liquid mixture and eventually to a pure solid once all the latent heat is given up. Typically, the latent heat transfer takes place isothermally at a temperature between 0 ° C. and −40° C. Therefore, the phase change material can be selected as desired to have a freezing temperature capable of refrigerating the enclosures to within a desired temperature range. In one embodiment, for example, the phase change material comprises PlusICE E-12 phase change material manufactured by Environmental Process Systems Limited of the United Kingdom. The PlusICE E-12 phase change material has a freezing point of −11.6° C.

The system 100 includes ducts 114, 116 arranged in two closed-loop paths L1, L2 through which coolant flows between and through various of the system elements. More particularly, the eutectic thermal battery 130 contains two separate internal coolant loops. One of the coolant loops provides heat transfer between the eutectic thermal battery and the primary heat sinks 26 via loop L1. The primary heat sinks 26 act to carry heat out of the enclosures 110. In this regard, the primary heat sinks 26 are disposed in thermal contact with an interior of the enclosures 110, such as by being mounted within or proximate to the enclosures 110. The system 100 can include any number of primary heat sinks 26 and, in one embodiment, the system 100 includes one primary heat sink 26 for each enclosure 110 to be refrigerated.

In addition to the coolant loop providing heat transfer between the eutectic thermal battery 130 and the primary heat sinks 26, the eutectic thermal battery 130 includes a second internal loop in communication with loop L2. Loop L2 can be selectively connected to loop L1 so that loop L2 provides heat transfer selectively between the first cooling device 120 and either or both of the eutectic thermal battery 130 and the primary heat sinks 26. The first cooling device 120 can be, e.g., a heat exchanger or heat pump located in any number of different locations in thermal contact with a cold sink, such as the skin structure of an aircraft or other vehicle, a centralized liquid chiller device, and the like. For example, as shown in FIG. 14, the first cooling devices 120 are mounted in physical, and thus thermal, contact with a cold sink 124. In particular, the illustrated first cooling devices 120 are liquid-to-direct heat exchangers mounted in physical contact with a portion of an aircraft fuselage skin structure 124, which acts as the cold sink 124, such as in the location of the forward galley complex of the aircraft. The cooling devices 120 can be shaped to fit the contour of the fuselage skin structure 124, thereby improving the thermal contact therebetween.

The first cooling device 120 is sized to have the cooling capacity required to accommodate the total heat load from all of the primary heat sinks 26, as well as the capacity to remove the required latent heat to freeze the phase change material in the eutectic thermal battery 130 within a desirable time period when the cold heat sink 124 is capable of passively absorbing the heat from the coolant, such as during high altitude flight. As will be appreciated, however, the system 10 can include multiple cooling devices 120 that collectively have the required cooling capacity. The cooling device 120 can comprise any of a number of different devices as such are known to those skilled in the art such as, for example, any of a number of liquid-to-direct heat exchangers manufactured by Lytron. Alternatively, or additionally, the cooling device can include one or more liquid-to-direct heat pumps.

As indicated above, the system 100 is capable of operating in a number of different modes to provide continuous refrigeration to the enclosures 110. Typically, the system 100 is capable of operating in one of four modes: a direct passive mode, indirect passive mode, direct active mode, and indirect active mode. Depending on the mode of operation, coolant flows throughout the system 100 in various manners while being driven by the coolant pumps 140, 142, which can comprise variable or constant-speed coolant pumps. To control the mode of operation, and thus the flow path of the coolant, the valves V1–V7 are open and shut in various combinations. In one embodiment, then, the valves V1–V7 can comprise remote-controlled shut-off valves. As will be appreciated, the mode of operation can be selected in any of a number of different manners. For example, the mode of operation can be selected at least partially based upon the temperatures of the coolant, the cooling devices 120, 130, the heat sinks 26, 40, 50, and/or the interiors of the enclosures 110. In addition, the mode of operation can be selected based upon the refrigeration needs of the enclosures 110, as the enclosures 110 may require varying degrees of refrigeration, including no refrigeration.

To control the mode of operation, the system 100 can additionally include a controller (not shown) electrically connected to the valves V1–V7. In addition, the controller can be electrically connected to temperature sensors (not shown), which can be mounted in thermal contact with the coolant, the cooling devices 120, 130, the heat sinks 26, 40, 50, and/or the interiors of the enclosures 110. Based on temperature information transmitted to the controller from one or more of the temperature sensors, the controller can determine a mode of operation for the system 100 to operate. Thereafter, the controller can operate the valves V1–V7, as described below, to operate the system 100 in the respective modes. As will be appreciated, as the mode of operation can change, the controller can be adapted to continuously receive temperature information, or alternatively receive temperature information at a predetermined time interval.

To operate the system 100 in the direct passive mode, valves V1, V2, V5, V6 are opened to permit coolant to pass through ducts 114, 116 connected to the respective valves; and valves V3, V4, V7 are closed to prevent coolant from passing through the ducts connected to the respective valves. In operation in the direct passive mode, coolant is circulated by either or both of the coolant pumps 140, 142 and passes through loops L1, L2. As the coolant passes through loop L1, coolant having a temperature appropriately less than the internal temperature of the enclosures 110 passes through the first coolant heat sinks 40, which are in thermal contact with the primary heat sinks 26 and, hence, the interiors of the respective enclosures 110.

As the coolant passes through the first coolant heat sinks 40, the coolant absorbs heat from the primary heat sinks 26 and, hence, the interiors of the respective enclosures 110, and thereafter carries the heat away from the enclosures 110. As the heat is carried away from the enclosures 110, the temperature in the enclosures 110 drops, thereby refrigerating the enclosures 110 to within a predetermined temperature range. Thereafter, to reject the absorbed heat, the coolant is passed through the ducts 114 of loop L1 to the ducts 116 of loop L2 and to the first cooling device 120, which is in thermal contact with the cold heat sink 124. The coolant is cooled in the cooling device 120, which rejects heat to the cold heat sink 124, and the coolant then returns to the first coolant heat sinks 40 to absorb additional thermal energy.

Operating the system 100 in the direct passive mode advantageously allows the system 100 to utilize an existing, typically passive, cold heat sink 124 (e.g., fuselage skin) of a vehicle (e.g., aircraft) or other system employing the system 100. In this regard, the system 100 is capable of operating in the direct passive mode as long as the coolant is capable of maintaining a low enough thermodynamic state to facilitate adequate heat transfer out of the enclosures 110.

To operate the system 100 in the indirect passive mode, valves V1, V3, V4, and V6 are opened to permit coolant to pass through the ducts 114, 116 connected to the respective valves. Valves V2, V5 are closed to prevent coolant from passing through the ducts connected to the respective valves. In operation in the indirect passive mode, coolant is circulated by the coolant pump 140 and passes through loop L1. As the coolant passes through loop L1, coolant having a temperature less than the internal temperature of the enclosures 110 passes through first coolant heat sinks 40, which are in thermal contact with the interiors of respective enclosures 110.

As the coolant passes through the first coolant heat sinks 40, the coolant absorbs heat from the interiors of the respective enclosures 110, and thereafter carries the heat away from the enclosures 110. As the heat is carried away from the enclosures 110, the temperature in the interiors drops, thereby refrigerating the enclosures 110 to within a predetermined temperature range. Thereafter, to reject the absorbed heat, the coolant is passed through the ducts 114 of loop L1 to the eutectic thermal battery 130 where the coolant then passes through the eutectic thermal battery 130. As the coolant passes through the eutectic thermal battery 130, the phase change material in the eutectic thermal battery 130 absorbs the heat from the coolant, thereby decreasing the temperature of the coolant. With the coolant loop L1 typically comprising a closed loop, the process can then repeat, so that the coolant passes back through the first coolant heat sinks 40.

When the temperature of the cooling device 120 (e.g., as determined by the temperature of the aircraft fuselage skin structure 124 or other cold heat sink) is lower than the phase change material, circulation of coolant in loop L2 is enabled to remove the heat from the phase change material of the eutectic thermal battery 130. Powered by coolant pump 142, coolant passing through the eutectic thermal battery 130 in loop L2 absorbs the heat in the phase change material. Thereafter, the coolant passes through the ducts 116 to the cooling device 120 and thereby rejects thermal energy to the cold heat sink 124. By circulating the coolant through loop L2 during the indirect passive modes, the phase change material in the eutectic thermal battery 130 can be cooled, e.g., to or below the point of freezing, such that the system 100 can thereafter operate in the indirect passive mode to refrigerate the interiors of the enclosures 110.

By removing the heat from the phase change material, the phase change material in the eutectic thermal battery 130 can be maintained as either a liquid-solid mixture or a slightly sub-freezing solid as the phase change material absorbs heat from the coolant flowing in loop L1 and rejects the heat to the cold heat sink via coolant flowing through loop L2. In this regard, the system 100 can manage the phase change material phase mixture by controlling the coolant flow rates through loops L1 and L2 as the coolant passes through the eutectic thermal battery 130, as will be appreciated by those skilled in the art. Thus, isothermal heat transfer can be maintained between the coolant in loop L1 and the phase change material, and the phase change material and the coolant in loop L2. Advantageously, by maintaining isothermal heat transfer in the eutectic thermal battery 130, the system 100 can refrigerate the interior of the enclosures 110 without causing the consumables in the enclosures 110 to freeze. In some instances, however, such as when the enclosures 110 contain frozen food items, the system 100 can allow the phase change material in the eutectic thermal battery 130 to reach a sub-freezing solid state. Further, the system 100 can allow the phase change material in the eutectic thermal battery 130 to reach a sub-freezing solid state when the enclosures 110 do not contain any consumables and maintenance of the temperature within the enclosures 110 is not needed, thereby providing extra refrigeration capacity for ground operation during airport turnaround service. To allow the phase change material to reach a sub-freezing solid state (when the thermodynamic state of the cooling device 120 permits), the valves V1, V3 can be operated to permit continuous flow of coolant through coolant loop L2 until the phase change material in the euctectic thermal battery 130 reaches the desired temperature.

Operating the system 100 in indirect passive mode advantageously allows the system 100 to utilize an existing, typically passive, cold heat sink 124 (e.g., fuselage skin) of a vehicle (e.g., aircraft) or other system employing the system 100. In this regard, the system 100 is capable of operating in the indirect passive mode as long as the phase change material in the eutectic thermal battery 130 is capable of maintaining a low enough thermodynamic state to facilitate adequate heat transfer out of the enclosures 110. As will be appreciated, however, the thermodynamic state of the phase change material in some instances is too high to enable the system 100 to operate in the indirect passive mode. For example, in instances where the vehicle comprises an aircraft and the cold heat sink 124 comprises the aircraft fuselage skin, such an occasion might be representative of an instance where the aircraft is scheduled for revenue service after maintenance. Additionally, for example, abnormally long delays in airport turnaround service can also potentially exhaust the refrigeration capacity of the eutectic thermal battery 130. In such instances, the system 100 is advantageously capable of operating in a direct active mode and/or an indirect active mode to provide continuous refrigeration to the enclosures 110, as such may be determined by the aforementioned controller.

In either the direct or indirect active mode, the system 100 is capable of utilizing the heat pumps 60. As indicated above, the heat pumps 60 can be liquid-to-direct heat pumps that transfer thermal energy from the primary heat sinks 26 to the second coolant heat sinks 50.

In the direct active mode of operation, the coolant is circulated between the heat pumps 60 and the first cooling device 120 via coolant loops L1 and L2. Thus, to operate the system 100 in direct active mode, valves V1, V2, V5, and V7 are opened to permit coolant to pass through the ducts 114, 116 connected to the respective valves; and valves V3, V4, and V6 are closed to prevent coolant from passing through the ducts connected to the respective valves.

During operation of the system 100 in the direct active mode, direct coolant circulation is enabled between the first cooling device 120 and the second coolant heat sinks 50, which communicate with the primary heat sinks 26 via the heat pumps 60. Powered by one or both coolant pumps 140, 142, coolant is passed through the second coolant heat sinks 50, which are in thermal contact with the interiors of the respective enclosures via the heat pumps 60. As will be appreciated, in instances in which the system 100 operates in active mode (either direct or indirect), the temperature of the cold heat sink 124 and, hence, the coolant and second coolant heat sink 50, may not be sufficiently low to passively absorb heat from the primary heat sink 26. As such, the heat pumps 60 are capable of forcing the transfer of heat from the primary heat sinks 26 to the second coolant heat sink 50, as such is well known to those skilled in the art. As the coolant passes through the second coolant heat sinks 50, the heat pumps 60 transfer thermal energy from the primary heat sinks 26 to the second coolant heat sinks 50 and, hence, the coolant. Thus, the coolant absorbs heat from the interiors of the respective enclosures 110, and thereafter carries the heat away from the enclosures 110. As the heat is carried away from the interiors of the enclosures 110, the temperature in the interiors drops, thereby refrigerating the enclosures 110 to a predetermined temperature.

To reject the heat absorbed by the coolant in the direct active mode, the coolant is passed through portions of ducts 114, 116 to the first cooling device 120, which is in thermal contact with the cold heat sink 124 (e.g., aircraft fuselage skin structure, a liquid-to-liquid heat exchanger connected to a remote liquid chiller, or even a liquid chiller itself). As the coolant passes through the first cooling device 120, the heat is rejected to the cooling device 120 and, hence, the cold heat sink 124. After the heat in the coolant is rejected to the cold heat sink 124, the process can be repeated, with the coolant returning to the second coolant heat sink 50.

In addition to operating in the passive or direct active modes, the system 100 can operate in an indirect active mode. The indirect active mode can be triggered in situations, for example, when passive refrigeration is not possible due to the temperature of the cold heat sink 124. To operate the system 100 in indirect active mode according to one embodiment, valves V1, V3, V4, and V7 are opened to permit coolant to pass through the ducts 114, 116 connected to the respective valves; and valves V2, V5, and V6 are closed to prevent coolant from passing through the ducts 114, 116 connected to the respective valves. During operation in indirect active mode, the coolant passes through the ducts 114 and through the second coolant heat sinks 50, which are in thermal contact with the primary heats 26 sink via the heat pumps 60.

As the coolant passes through the second coolant heat sinks 50, the heat pumps 60 transfer thermal energy from the primary heat sinks 26 to the second coolant heat sinks 50 and, hence, the coolant. Thus, the coolant absorbs heat from the interiors of the respective enclosures 110, and thereafter carries the heat away from the enclosures 110. As the heat is carried away from the enclosures 110, the temperature in the enclosures 110 drops, thereby refrigerating the enclosures 110 to a predetermined temperature.

To reject the heat absorbed by the coolant in the indirect active mode, the coolant is passed through portions of ducts 114 to the eutectic thermal battery 130. As the coolant passes through the thermal battery 130, heat is rejected to the battery 130. After the heat in the coolant is rejected to the battery 130, the process can be repeated, with the coolant returning to the second coolant heat sinks 50.

When the temperature of the cooling device 120 (e.g., as determined by the temperature of the aircraft fuselage skin structure or other cold heat sink 124) is lower than the phase change material, circulation of coolant in loop L2 is enabled to remove the heat from the phase change material. Powered by coolant pump 142, coolant passing through the eutectic thermal battery 130 in loop L2 absorbs the heat in the phase change material. Thereafter, the coolant passes through the ducts 116 to the cooling device 120 and thereby rejects thermal energy to the cold heat sink 124.

The system 100 can also include or otherwise access a store 150 of a compressed inert fluid that can be expanded to ambient atmospheric pressure in order to cool the thermal battery 130. For example, the store 150 can hold compressed nitrogen, nitrogen-enriched air, carbon dioxide or the like. To utilize the store 150 of inert composition, the eutectic thermal battery 130 can include an evaporator coil 152, which is in variable fluid contact with the store 150, such as via a throttling valve 154. During any of the modes of operation, the store 150 can be activated by controllably opening and closing the throttling valve 154, thereby expanding the inert composition through the throttling valve 154 into the evaporator coil 152 inside the eutectic thermal battery 130. The super-cold composition can then act as a very powerful refrigerant to cool the phase change material. In this regard, the phase change material in the eutectic thermal battery 130 typically gradually freezes as the latent heat of fusion of the phase change material is lost to the cold nitrogen vapor through the walls of the evaporator coil 152. Thus, the eutectic thermal battery 130 can be recharged to provide adequate refrigeration to the enclosures 110. After cooling the phase change material, the spent fluid from the store 150 can be ejected out of the aircraft, such as via an air hose connecting the evaporator coil 152 to a purge valve 156 mounted to the aircraft skin structure.

Advantageously, as used in vehicles such as aircraft, the system 100 need not include the store 150 of inert composition. In such instances, the system 100 may utilize a store 150 of inert composition existing onboard the aircraft for other purposes, such as preventing fuel tank explosion. As is well known to those skilled in the art, liquid nitrogen has historically been used on aircraft for galley refrigeration. Such a practice has decreased in recent years due to the expense of carrying liquid nitrogen tanks onboard aircraft. A recent Federal Aviation Administration (FAA) requirement to prevent fuel tank explosion, however, may necessitate that aircraft provide means to inert the atmosphere inside the aircraft fuel tanks. In this regard, nitrogen gas or nitrogen-enriched air are considered by many as the leading candidates to be used as the innerting agent inside aircraft fuel tanks. As such, future aircraft may be required to have either ground-based or aircraft-based nitrogen storage or generation capability, which the system 100 can utilize to absorb heat from the phase change material.

It should be noted that although the foregoing may have described the modes of operation of the system 100 as depending on separate instances, the system 100 can operate in any mode at any instance, subject only to the thermodynamic state (or temperature) of the first cooling device 120. For example, the system 100 can operate in either the direct active or indirect active modes at instances in which the system 100 can equally operate in the indirect passive mode.

It should also be understood that whereas the system 100 may include the various elements as described herein, the system 100 may additionally or alternatively incorporate other valves, reservoirs, demineralizers, accumulators, heat exchangers, heat pumps, sensors, other flow loop control and instrumentation devices or the like as may be required by the system 100 to maintain temperature, flow rate, and pressure of the coolant and/or phase change material within prescribed limits. For example, one or more additional cooling devices can be provided in a parallel circuit with the first cooling device 120, and valves can be provided for selectively connecting the first and second coolant heat sinks 40, 50 to the additional cooling device(s) instead of the first cooling device 120 in the passive and active modes, respectively.

Therefore, the system and method of the present invention are capable of refrigerating one or more enclosures utilizing the "free" thermal potential provided by the natural cold heat sink of a vehicle or system with which the system is operated. Advantageously, when the system and method are operated onboard an aircraft, for example, the system and method can refrigerate enclosures, such as galley carts on the aircraft, without the use of a vapor-compression cycle air chiller. Further, the system and method of embodiments of the present invention provide a hybrid refrigeration cycle in which the primary heat exchanger can be cooled in selective passive and active modes of operation. Advantageously, the first and second coolant heat sinks can cool a common primary heat sink, thereby integrating passive and active cooling technologies to provide continuous refrigeration to enclosures, such as aircraft galley carts.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for selectively actively and passively refrigerating an enclosure, the apparatus comprising:
   a primary heat sink defining at least one surface configured to receive thermal energy from a gas in the enclosure, thereby cooling the gas and refrigerating the enclosure;
   a first coolant heat sink in thermal communication with the primary heat sink and defining at least one passage for circulating a coolant such that the coolant is configured to cool the primary heat sink;
   at least one heat pump in thermal communication with the primary heat sink and configured to cool the primary heat sink; and
   a second coolant heat sink in thermal communication with the primary heat sink via the heat pump, the second coolant heat sink defining at least one passage for circulating coolant such that the coolant is configured to receive thermal energy from the primary heat sink via the heat pump.

2. An apparatus according to claim 1 further comprising at least one coolant loop fluidly connected to the passages defined by the first and second coolant heat sinks, and at least one pump configured to circulate the coolant through the at least one coolant loop and the first and second coolant heat sinks.

3. An apparatus according to claim 2 further comprising at least one cooling device, the coolant loop being in thermal communication with the at least one cooling device such that the at least one cooling device is configured to cool the coolant in the coolant loop.

4. An apparatus according to claim 3 wherein the at least one cooling device is configured to reject heat to a cold sink, the cold sink including at least a portion of an aircraft fuselage skin structure.

5. An apparatus according to claim 3 wherein the at least one cooling device is a eutectic thermal battery.

6. An apparatus according to claim 1 wherein the heat pump is at least one of the group consisting of thermionic devices, thermoelectric devices, and thermoelectric-thermionic hybrid devices, and the heat pump is configured to actively transfer thermal energy from the primary heat sink to the second coolant heat sink.

7. An apparatus according to claim 1 wherein the at least one surface of the primary heat sink defines a plurality of elongate fins extending from the primary heat sink and configured to contact the gas in the enclosure and receive thermal energy therefrom.

8. An apparatus according to claim 1 wherein the primary heat sink includes a base portion defining a vapor chamber.

9. An apparatus according to claim 1 wherein the primary heat sink includes a base portion with at least one heat pump embedded therein.

10. An apparatus according to claim 1 further comprising at least one fan configured to circulate the gas in thermal communication with the primary heat sink, thereby heating the primary heat sink and cooling the gas.

11. An apparatus according to claim 1 wherein the apparatus is configured to operate selectively in passive and active modes, the passive mode being characterized by circulation of the coolant through the first coolant heat sink such that thermal energy is transferred from the primary heat sink to the coolant, and the active mode characterized by circulation of the coolant through the second coolant heat sink and operation of the at least one heat pump such that thermal energy is transferred from the primary heat sink to the coolant via the heat pump.

12. An apparatus according to claim 11 wherein the system is configured to refrigerate the enclosure to a temperature below about 7° C. in the passive mode and below about 0° C. in the active mode.

13. An apparatus according to claim 1 further comprising first and second cooling devices in selective fluid communication with the passages defined by the first and second coolant heat sinks, the apparatus being configured to operate selectively in direct and indirect passive modes and direct and indirect active modes, the direct passive mode being characterized by circulation of the coolant through the first coolant heat sink and the first cooling device, the indirect passive mode being characterized by circulation of the coolant through the first coolant heat sink and the second cooling device, the direct active mode being characterized by circulation of the coolant through the second coolant heat sink and the first cooling device, and the indirect active mode being characterized by circulation of the coolant through the second coolant heat sink and the second cooling device.

14. An apparatus according to claim 13 wherein the first cooling device is configured to reject heat to a cold sink including at least a portion of an aircraft fuselage skin structure and the second cooling device is a eutectic thermal battery.

15. An apparatus according to claim 1 wherein the first coolant heat sink is in direct thermal communication with the primary heat sink such that the coolant in the passage defined by the first coolant heat sink is configured to cool the primary heat sink.

16. An apparatus according to claim 1 wherein the heat pump is in direct thermal communication with the primary heat sink and the second coolant heat sink such that the heat pump is configured to absorb thermal energy from the primary heat sink and communicate the thermal energy to the coolant in the passage defined by the second coolant heat sink.

17. A system for selectively actively and passively refrigerating at least one enclosure, the system comprising:
    at least one heat transfer apparatus comprising:
        a primary heat sink defining at least one surface configured to receive thermal energy from a gas in at least one of the enclosures, thereby cooling the gas and refrigerating the enclosure;
        a first coolant heat sink in thermal communication with the primary heat sink and defining at least one passage for circulating a coolant such that the first coolant is configured to cool the primary heat sink;
        at least one heat pump in thermal communication with the primary heat sink and configured to cool the primary heat sink; and
        a second coolant heat sink in thermal communication with the primary heat sink via the heat pump, the second coolant heat sink defining at least one passage for circulating coolant such that the coolant is configured to receive thermal energy from the primary heat sink via the heat pump; and
    at least one coolant loop fluidly connected to the passages defined by the first and second coolant heat sinks; and
    at least one cooling device, the coolant loop being in thermal communication with the at least one cooling device such that the at least one cooling device is configured to cool the coolant in the coolant loop,
    wherein the apparatus is configured to operate selectively in passive and active modes, the passive mode being characterized by circulation of the coolant through the first coolant heat sink such that thermal energy is transferred from the primary heat sink to the cooling device by the coolant, and the active mode being characterized by circulation of the coolant through the second coolant heat sink and operation of the at least one heat pump such that thermal energy is transferred from the primary heat sink to the coolant via the heat pump and to the cooling device by the coolant.

18. A system according to claim 17 further comprising at least one pump configured to circulate the coolant through the at least one coolant loop and the first and second coolant heat sinks.

19. A system according to claim 17 wherein the at least one cooling device is configured to reject heat to a cold sink, the cold sink including at least a portion of an aircraft fuselage skin structure.

20. A system according to claim 17 wherein the at least one cooling device is a eutectic thermal battery.

21. A system according to claim 20 further comprising a store of compressed fluid configured to be expanded and thereby cool the thermal battery.

22. A system according to claim 20 wherein the eutectic thermal battery is thermally connected to a second cooling device such that the eutectic thermal battery is configured for recharging by the second cooling device.

23. A system according to claim 17 wherein the at least one heat pump is at least one of a thermionic device, a thermoelectric device, and a thermionic-thermoelectric hybrid device configured to actively transfer thermal energy from the primary heat sink to the second coolant heat sink.

24. A system according to claim 17 wherein the at least one surface of the primary heat sink defines a plurality of elongate fins configured to contact the gas in the enclosure and receive thermal energy therefrom.

25. A system according to claim 17 wherein the primary heat sink includes a base portion defining a vapor chamber.

26. A system according to claim 17 wherein the primary heat sink includes a base portion with at least one heat pump embedded therein.

27. A system according to claim 17 wherein each heat transfer apparatus further comprises a fan configured to circulate the gas in thermal communication with the primary heat sink, thereby heating the primary heat sink and cooling the gas.

28. A system according to claim 17 wherein each heat transfer apparatus is configured to refrigerate the enclosure to a temperature below about 7° C. in the passive mode and below about 0° C. in the active mode.

29. A system according to claim 17 further comprising first and second cooling devices in selective fluid communication with the passages defined by the first and second coolant heat sinks, each heat transfer apparatus being configured to operate selectively in direct and indirect passive modes and direct and indirect active modes, the direct passive mode being characterized by circulation of the coolant through the first coolant heat sink and the first cooling device, the indirect passive mode being characterized by circulation of the coolant through the first coolant heat sink and the second cooling device, the direct active mode being characterized by circulation of the coolant through the second coolant heat sink and the first cooling device, and the indirect active mode being characterized by circulation of the coolant through the second coolant heat sink and the second cooling device.

30. A system according to claim 29 wherein the first cooling device is configured to reject heat to a cold sink including at least a portion of an aircraft fuselage skin structure and the second cooling device is a eutectic thermal battery.

31. A system according to claim 17 wherein the first coolant heat sink is in direct thermal communication with the primary heat sink such that the coolant in the passage defined by the first coolant heat sink is configured to cool the primary heat sink.

32. A system according to claim 17 wherein the heat pump is in direct thermal communication with the primary heat sink and the second coolant heat sink such that the heat pump is configured to absorb thermal energy from the primary heat sink and communicate the thermal energy to the coolant in the passage defined by the second coolant heat sink.

33. A method for selectively refrigerating an enclosure in passive and active modes, the method comprising:
absorbing thermal energy by a primary heat sink from a gas of the enclosure, thereby cooling the gas and refrigerating the enclosure;
cooling the primary heat sink in the passive mode by circulating a coolant through a first passage in thermal communication with the primary heat sink, thereby rejecting thermal heat from the enclosure to the coolant in the first passage; and
cooling the primary heat sink in an active mode by operating a heat pump in thermal communication with the primary heat sink and circulating the coolant through a second passage in thermal communication with the primary heat sink via the heat pump, thereby rejecting thermal heat to the coolant in the second passage.

34. A method according to claim 33 wherein said first cooling step comprises operating at least one pump to circulate the coolant through a first loop fluidly connected to the first passage and said second cooling step comprises operating the at least one pump to circulate the coolant through a second loop fluidly connected to the second passage.

35. A method according to claim 33 wherein said first and second cooling steps comprise circulating the coolant through at least one cooling device, thereby cooling the coolant.

36. A method according to claim 35 wherein at least one of said first and second cooling steps comprises circulating the coolant through a cooling device in thermal communication with an aircraft skin structure.

37. A method according to claim 33 wherein at least one of said first and second cooling steps comprises circulating the coolant through a cooling device in thermal communication with a eutectic thermal battery.

38. A method according to claim 37 further comprising expanding a compressed fluid and thereby cooling the eutectic thermal battery.

39. A method according to claim 37 further comprising rejecting heat from the eutectic thermal battery to a cold sink and thereby recharging the battery.

40. A method according to claim 33 wherein said absorbing step comprises absorbing thermal energy from the gas through a plurality of elongate fins.

41. A method according to claim 33 said absorbing step includes vaporizing a fluid contained in a chamber defined by the primary heat sink.

42. A method according to claim 33 wherein the absorbing step comprises operating a fan configured to circulate the gas and thereby convectively heat the primary heat exchanger.

43. A method according to claim 33 wherein said first cooling step comprises selectively circulating the coolant through a first cooling device in a direct passive mode and through a second cooling device in an indirect passive mode.

44. A method according to claim 43 wherein said first cooling step comprises circulating the coolant through the cooling device and rejecting heat from the cooling device to a sink including at least a portion of an aircraft fuselage skin structure in the direct passive mode and circulating the coolant through a eutectic thermal battery in the indirect passive mode.

45. A method according to claim 33 wherein at least one of said cooling steps comprises refrigerating the enclosure to a temperature below about 7° C. in the passive mode and below about 0° C. in the active mode.

46. A method according to claim 33 wherein said first cooling step comprises circulating the coolant through the first passage defined by a first coolant heat sink in direct thermal communication with the primary heat sink such that the coolant in the first passage receives thermal energy from the primary heat sink, and wherein the second cooling step comprises circulating the coolant through the passage defined by a second coolant heat sink in direct thermal communication with the heat pump in direct thermal communication with the primary heat sink such that the heat pump absorbs thermal energy from the primary heat sink and communicates the thermal energy to the coolant in the second passage.

* * * * *